United States Patent [19]
Kallioniemi et al.

[11] Patent Number: 6,064,887
[45] Date of Patent: May 16, 2000

[54] TELECOMMUNICATIONS NETWORK WITH PORTABILITY OF MOBILE SUBSCRIBER NUMBER

[75] Inventors: Karl-Erik Kallioniemi, Skoghall; Mikael Larsson, Karlstad; Björn Olsson, Klässbol; Per-Erik Mikael Kilhage, Karlstad, all of Sweden

[73] Assignee: Telefonaktiebolaget LM Ericsson, Stockholm, Sweden

[21] Appl. No.: 08/764,634

[22] Filed: Dec. 11, 1996

Related U.S. Application Data

[63] Continuation-in-part of application No. 08/733,930, Oct. 18, 1996.

[51] Int. Cl.$^7$ .............................. H04Q 7/20; H04Q 7/36
[52] U.S. Cl. .................... 455/445; 455/432; 455/433; 455/434; 455/436; 455/438; 455/439; 455/440; 379/220; 379/207; 379/230; 379/219; 379/221
[58] Field of Search .................................. 455/445, 432, 455/433, 434, 436, 438, 439, 440, 421, 550, 446; 379/220, 207, 230, 219, 221, 201, 229, 231

[56] References Cited

U.S. PATENT DOCUMENTS

| | | |
|---|---|---|
| 4,791,665 | 12/1988 | Bogart et al. . |
| 4,933,967 | 6/1990 | Lo et al. . |
| 5,270,701 | 12/1993 | Ito et al. . |

(List continued on next page.)

FOREIGN PATENT DOCUMENTS 44 41 753 A1   6/1995   Germany .

OTHER PUBLICATIONS

Australian Communications Authority, "Report on Technical Options for Mobile Number Portability Implementation in Australia", http://www.austel.gov.au/telecom/number/nbrport/accmnp.htm, Mar. 1998, pp. 1–2 and 26–39.

G. Nilsson, "Number Portability: A Networking Perspective", Telecommunications Magazine, http://www.telecoms--mag.com/marketing/articles/jul97/nilsson.html, Jul. 1997, pp. 1–6.

Sonnenberg et al., "Siemens Stromberg–Carlson's Contribution to MCI Metro's Local Number Portability Architecture Task Force Team", Feb. 1995, pp. 1–13 and attachments 1 and 2.

Arndt Ritterbecks, et al, "Performance Evaluation of Database Concepts for Personal Communication System", Third International Conference on Intelligence in Broadband Service and Networks, Oct. 1995, pp. 309–319.

Masanobu Fujioka, et al, "Hierarchial and Distributed Information Handling for UPT", IEEE Network Magazine, vol. 4, No. 6, Nov. 1990, pp. 50–60.

(List continued on next page.)

Primary Examiner—Fan S. Tsang
Assistant Examiner—Keith Ferguson
Attorney, Agent, or Firm—Nixon & Vanderhye, P.C.

[57] ABSTRACT

A telecommunications network (10) comprises a set of service provider/operator domains (20), including mobile telecommunications domains (20A–20C). A call-originating domain (20F) accesses a mobile subscriber number portability database (30F) to obtain the address of the gateway node (GMSC) of the telecommunications domain which currently serves a called mobile subscriber having a mobile station (70), and optionally the address of the home location register (HLR) of the called mobile subscriber. The address of the gateway node obtained from the database (and optionally the address of the home location register) are included along with the directory number (MSISDN) or IMSI of the called mobile subscriber in a routing message for completing the call. When changing service providers (e.g., changing to a new domain), the mobile subscriber number portability database is updated to reflect the change. Access of the database and usage of the address of the gateway node of the new domain in the routing message permit the mobile subscriber to retain the same MSISDN when changing service providers.

3 Claims, 15 Drawing Sheets

U.S. PATENT DOCUMENTS

| | | |
|---|---|---|
| 5,333,184 | 7/1994 | Doherty et al. . |
| 5,369,684 | 11/1994 | Buhl et al. .............................. 455/445 |
| 5,400,390 | 3/1995 | Salin ...................................... 455/445 |
| 5,467,381 | 11/1995 | Peltonen et al. ....................... 455/445 |
| 5,467,388 | 11/1995 | Redd, Jr. et al. . |
| 5,473,681 | 12/1995 | Partridge, III . |
| 5,475,749 | 12/1995 | Akinpelu et al. . |
| 5,506,894 | 4/1996 | Billings et al. ........................ 379/127 |
| 5,515,427 | 5/1996 | Carlsen et al. . |
| 5,533,107 | 7/1996 | Irwin et al. . |
| 5,539,817 | 7/1996 | Wilkes . |
| 5,550,910 | 8/1996 | DeJager . |
| 5,550,912 | 8/1996 | Akinpelu et al. . |
| 5,550,915 | 8/1996 | Partridge, III . |
| 5,553,129 | 9/1996 | Partridge, III . |
| 5,566,235 | 10/1996 | Hetz ...................................... 455/432 |
| 5,583,926 | 12/1996 | Venier et al. . |
| 5,598,464 | 1/1997 | Hess et al. . |
| 5,610,977 | 3/1997 | Williams et al. . |
| 5,625,681 | 4/1997 | Butler, II . |
| 5,661,792 | 8/1997 | Akinpelu et al. . |
| 5,689,555 | 11/1997 | Sonnenberg . |
| 5,696,816 | 12/1997 | Sonnenberg . |
| 5,699,416 | 12/1997 | Atkins . |
| 5,703,939 | 12/1997 | Bushnell . |
| 5,724,658 | 3/1998 | Hasan ...................................... 455/445 |
| 5,732,131 | 3/1998 | Nimmagadda et al. . |
| 5,748,724 | 5/1998 | Sonnenberg . |
| 5,757,894 | 5/1998 | Kay et al. . |
| 5,758,281 | 5/1998 | Emery et al. . |
| 5,761,620 | 6/1998 | Furuya et al. ........................ 455/445 |
| 5,764,745 | 6/1998 | Chan et al. . |
| 5,768,358 | 6/1998 | Venier et al. . |
| 5,832,382 | 11/1998 | Alperovich ............................ 455/433 |
| 5,839,072 | 11/1998 | Chien ...................................... 455/445 |

OTHER PUBLICATIONS

Henning MaaB, et al, "Directory Services for Mobility Management in Private Telecommunication Networks", IEEE International Conference on Communications, vol. 2, May 1993, pp. 1252–1256.

Gregory Lauer, "IN Architectures for Implementing Universal Personal Telecommunications", IEEE Network Magazine, vol. 8, No. 2, Mar. 1994–Apr. 1994, pp. 6–16.

TELECOMMUNICATIONS NETWORK WITH PORTABILITY OF MOBILE SUBSCRIBER NUMBER

BACKGROUND

This application is a continuation-in-part of U.S. patent application Ser. No. 08/733,930, filed Oct. 18, 1996, entitled TELECOMMUNICATIONS NETWORK WITH RELOCATEABILITY OF SUBSCRIBER NUMBER, which is commonly assigned and incorporated herein by reference. This application is related to simultaneously filed U.S. patent application Ser. No. 08/764,633, entitled PORTABILITY OF NON-GEOGRAPHIC TELEPHONE NUMBERS OF INTELLIGENT NETWORK SERVICES, which is incorporated herein by reference.

FIELD OF INVENTION

This invention pertains to telecommunications systems, and particularly to the routing of calls through a telecommunications system for a mobile subscriber.

RELATED ART AND OTHER CONSIDERATIONS

A telecommunications network typically includes a number of physical nodes, often referred to as local exchanges, to which subscribers are connected. The local exchanges are generally connected in the telecommunications network by other physical nodes, known as transit exchanges.

To simply the routing of calls through the network and to have a good structure of a telephone numbering plan, each local exchange is allocated one or more unique exchange number groups. The telephone number of a subscriber typically includes both an exchange number group (typically a 10,000 number block) for the exchange to which a subscriber is connected, and a number in that group which is peculiar to the subscriber. For example, a subscriber having a telephone number "881-1657" is connected to a local exchange having an exchange number group "881", and within that group the subscriber has a subscriber number of "1657". The subscriber's telephone number is published or otherwise circulated as his directory telephone number e.g., in a telephone directory or book.

A common way of routing a call through a telecommunications network to a final destination is to use the directory telephone number of the called party (e.g., the called subscriber). In particular, the called party's directory telephone number occupies an address signal field of an ISUP parameter known as the "Called Party Number" parameter ("CdPN"), with the "Called Party Number" parameter ("CdPN") being a routing or address message utilized for routing purposes.

Using the directory telephone number of the called party for routing purposes has numerous problems, particularly when a subscriber physically relocates or changes service providers. If the relocating or provider-changing subscriber wants to keep his original directory number, he must be connected by a special physical line to his same local exchange. Such physical connection is quite expensive when the subscriber has moved far away from the local exchange. If the relocation is such that the subscriber's connection to the telecommunications network changes from an old local exchange to a new local exchange, on the other hand, the provider of the telecommunications network is not able to accommodate relocation of the subscriber without changing the subscriber's directory telephone number.

Changing a directory telephone number in the event of relocation of a subscriber occasions expense and effort for both the subscriber and the telecommunications provider. For the provider, it is expensive to administer the changes of directory telephone numbers when a subscriber relocates from one area to another. The administration required by the provider includes both efforts to define available new numbers in the new location (i.e., at the new local exchange) and to update the published directory. The relocated subscriber incurs expense in providing notice of the new directory number to potential callers (friends and business contacts). If such notice is not provided or retained by the potential callers, calls may not be placed to the relocated subscriber. Loss of calls to a relocated subscriber can result in loss of social or business opportunity.

The problem of subscriber number portability is even more acute for mobile subscribers. Presently, a call to a mobile station is routed by including a MSISDN—the directory number of the mobile subscriber—in the aforementioned address signal field of the "Called Party Number" ISUP parameter ("CdPN"). As a consequence of inclusion of the MSISDN in the Called Party Number "CdPN" parameter, the call is routed to a Gateway Mobile Switching Center (GMSC). Whereas a Mobile Switching Exchange (MSC) is a telephone exchange having a mobile telephone subsystem (MTS), a Gateway Mobile Switching Center (GMSC) is a MSC which is linked to other (e.g., non-mobile) networks such as PSTN or ISDN networks. All incoming calls to a mobile network are routed to a GMSC, which serves as an incoming transit exchange. The GMSC has an interrogation call routing function for mobile terminated calls which enables the system to route calls to the mobile subscribers.

The Gateway Mobile Switching Centers (GMSC) use the MSISDN as "Global Title" to request that the mobile subscriber's home location register (HLR) fetch the mobile subscriber's roaming number from the MSC in which the mobile subscriber is currently located. The request to the HLR for the mobile subscriber's roaming number is sometimes termed a send routing information (SRI) operation. The SRI request may be directed to the HLR through one or more signal transfer points (STPs). The STPs have routing tables which are utilized to direct the SRI request to the particular HLR which is appropriate for the called mobile subscriber. However, when mobile subscribers are allowed to retain their MSISDNs after changing from one service provider to another, the routing tables for any intermediate STP will be enormous and need to be updated for every mobile subscriber who changes service providers. Indeed, mobile subscribers will change service providers if their MSISDN number can be retained, since subscribers can then make choice of provider decisions based on considerations of pricing, service, and features other than keeping their number.

In a mobile network, allowing mobile subscribers to retain MSISDN numbers when changing service providers causes considerable problems. These problems stem, at least in part, from the fact that the MSISDN is used both as the address of the GMSC of the called party and to locate the home location register (HLR) for the called party.

When MSISDN number portability is afforded to mobile subscribers, any reorganization of number series served by the HLRs becomes difficult. In this regard, it sometimes occurs that, due to capacity or other reasons, the service provider desires to split the load of a single HLR so that it is carried by two HLRs. Implementing such reorganization is problematic if mobile subscribers are able to change service providers and yet maintain their original MSISDNs.

What is needed therefore, and an object of the present invention, is an efficient way of facilitating providing number portability for a mobile subscriber, as occurs for example when a mobile subscriber changes service providers.

SUMMARY

A telecommunications network comprises a set of service provider/operator domains, including mobile telecommunications domains. A call-originating domain accesses a mobile subscriber number portability database to obtain the address of the gateway node of the telecommunications domain which currently serves a called mobile subscriber, and optionally the address of the home location register of the called mobile subscriber. The address of the gateway node obtained from the database (and optionally the address of the home location register) are included along with the directory number (MSISDN) or IMSI of the called mobile subscriber in a routing message for completing the call. When changing service providers (e.g., changing to a new domain), the mobile subscriber number portability database is updated to reflect the change. Access of the database and usage of the address of the gateway node of the new domain in the routing message permit the mobile subscriber to retain the same MSISDN when changing service providers.

The call-originating domain can be a fixed subscriber domain having e.g., PSTN or ISDN services, for example, or a mobile telecommunications domain.

The information obtained from the mobile subscriber number portability database is included as a parameter in an address signal field of an industry standard called party number (CdPN) parameter.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1A:
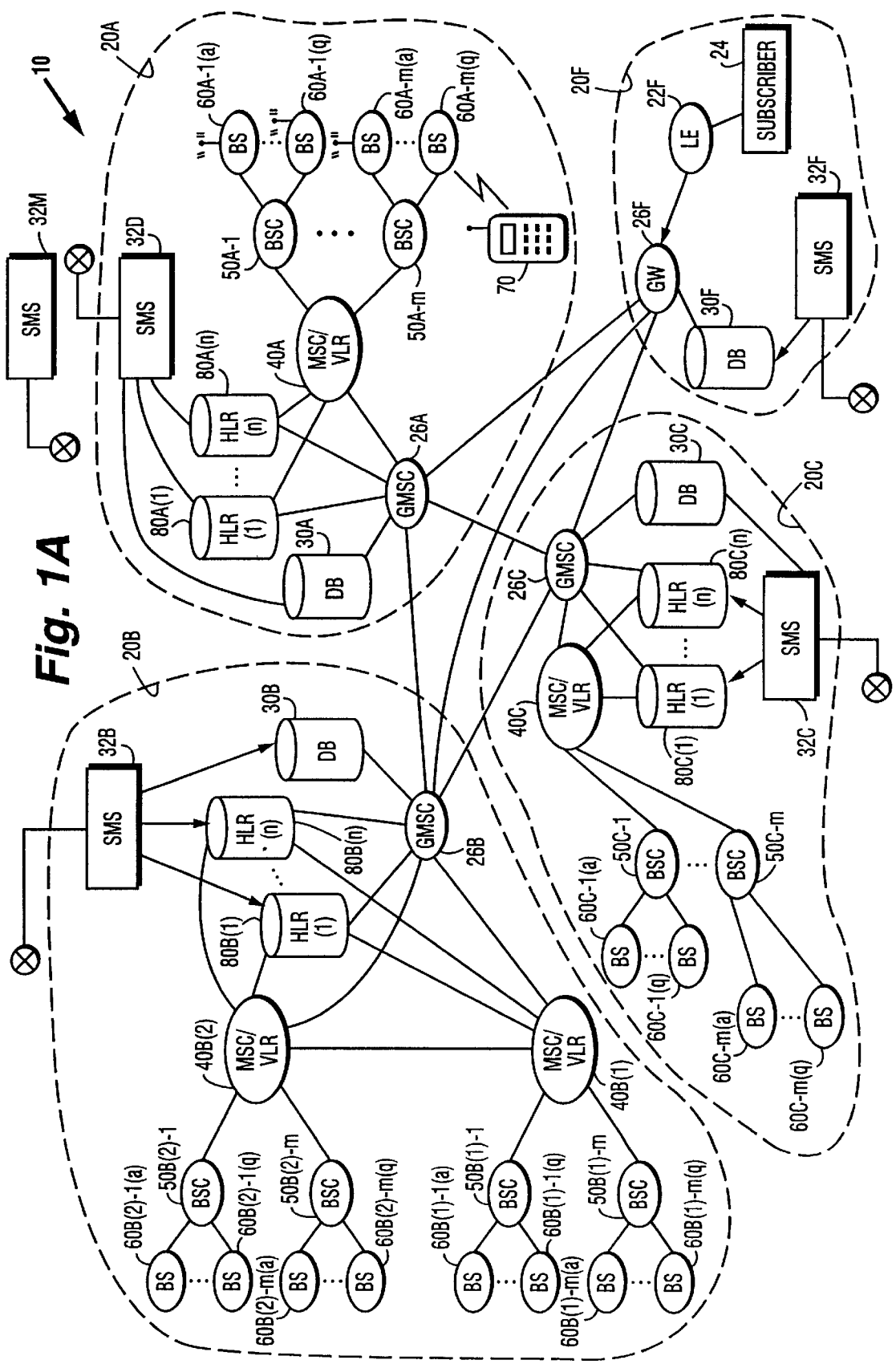
FIG. 1A is a schematic view of a telecommunications system according to an embodiment of the present invention with a mobile subscriber subscribing to a first service provider.

FIG. 1A shows a telecommunications system or network 10 according to an embodiment of the invention. Network 10 includes a set of service provider domains 20A–20C and 20F. Three of the domains (particularly domains 20A–20C) are mobile telecommunications domains serving mobile stations; domain 20F serves fixed stations. In the illustrated embodiment, domain 20F can be of a network type such as an public switched telephone network (PSTN) or integrated services digital network (ISDN), for example. At least some of the areas served by domains 20 can be, and likely are, geographically coextensive. In one mode of the invention, some of the domains 20 are served by differing service providers, e.g., different telecommunications operating companies.

Fixed station domain 20F includes at least one local exchange 22F. Local exchange 22F is connected to a plurality of fixed subscriber stations, only one of which (subscriber 24) is shown in FIG. 1A. Local exchange 22F is connected either directly or ultimately (e.g., via transit exchanges) to a gateway exchange or gateway node 26F. Gateway node 26F is connected to a database 30F. Database 30F is, in turn, connected (e.g., for updating and maintenance purposes) to a service management system 32F.

Mobile telecommunications domains 20A–20C each have respective gateway nodes 26A–26C, each of which takes the form of gateway mobile services switching center (GMSC) and accordingly are respectively referred to as GMSCs 26A–26C. Each gateway node 26A–26C and 26F is connected to a gateway node of at least one other domain, all gateways nodes being interconnected in the particular example shown in FIG. 1A.

Each gateway node GMSC 26 serves as an interface to external domains 20 for one or more mobile services switching centers (MSCs) 40 which belong to the domain. Each MSC 40 includes a telephone exchange (such as an Ericsson AXE exchange) and a mobile telephone subsystem (MTS).

Although any given domain likely has a plurality of MSCs 40, only a single MSC 40A is shown for domain 20A and a single MSC 40C is shown for domain 20C. For sake of illustration, domain 20B is pictured as having two MSCs, particularly MSC 40B(1) and MSC 40B(2). Each GMSC 26 is connected to the MSCs 40 in its domain; MSCs 40 in the same domain may also be connected. Since MSCs 40 generally also include or access a Visitor Location Register (VLR), each MSC 40 is labeled in FIG. 1A as MSC/VLR. For the particular embodiments mentioned hereinafter, reference to an MSC is to a MSC/VLR, particularly in the context of activity involving an HLR.

Each MSC 40 in FIG. 1A is connected to serve at least one and preferably a plurality of base station controllers (BSCs) 50. For example, MSC 40A serves base station controllers 50A-1 through 50A-m; MSC 40B(1) serves base station controllers 50B(1)-1 through 50B(1)-m; MSC 40B(2) serves base station controllers 50B(2)-1 through 50B(2)-m; MSC 40C serves base station controllers 50C-1 through 50C-m. It should be understood that typically differing MSCs 40 serve a differing number of base station controllers 50.

Each base station controller 50 is connected to one or more base transceiver stations (BS) 60. For example, base station controller 50A-1 is connected to base transceiver stations (BS) 60A-1(a) through 60A-1(q). The number of base transceiver stations (BS) 60 per base station controller 50 can vary.

Each base transceiver stations (BS) 60 transmits and receives radio frequency communications to and from a plurality of mobile subscribers (MS) 70 in the geographical areas served by the respective BS 60. For sake of simplicity and illustration, only one mobile station 70 is shown in FIG. 1A, although it should be understood that each domain 20 serves hundreds if not thousands of unillustrated mobile stations. The particular mobile station 70 shown in FIG. 1A is, at the moment, served by base transceiver station (BS) 60A-m(q).

Each of the mobile telecommunications domains 20A–20C further includes a plurality of Home Location Registers (HLRs) 80. Domain 20A has HLRs 80A(1) through 80A(n); domain 20B has HLRs 80B(1) through 80B(n); domain 20C has HLAs 80C(1) through 80C(n). When a subscriber obtains a mobile station and buys a subscription from a provider/operator of one of the domains 20A–20C, the subscriber's mobile station is registered in an HLR 80 of that provider/operator. The HLR 80 contains, for each subscriber, subscriber information, such as supplementary services and authentication parameters. Furthermore, HLR 80 includes updated information about the current location of the mobile station, i.e., in which MSC area the mobile station resides presently. This current location information in HLR 80 changes as the mobile station moves, in a manner well understood in the art. The mobile station sends location information (via the MSC/VLR 40) to its HLR 80, thus providing means to receive a call. Each HLR 80 is typically connected to the gateway node 26 in its domain, as well as to the MSC/VLRs 40 in its domain.

In addition to the foregoing, mobile telecommunications domains 20A–20C each include respective databases 30A–30C. Databases 30A–30C are connected to and maintained by service management systems 32A–32C, respectively. Similarly, service management systems 32A–32C are connected to and maintain the respective HLRs 80A(1) through 80A(n); 80B(1) through 80B(n); and 80C(1) through 80C(n). Service management systems 32A–32C are connected to and supervised by a master service management system 32M.

Databases 30 are subscriber location servers which are augmented with additional intelligence and accordingly are known and denominated (e.g., in U.S. patent application Ser. No. 08/739,930, filed Oct. 18, 1996, incorporated herein by reference) as a network number and address portability servers (NAPS). Databases 30 include information which facilitates number portability for many types of subscribers in their respective domains, including mobile subscribers. Without overlooking the broader use of the databases 30, for convenience herein, the databases 30 will sometimes be referred to as mobile subscriber number portability databases 30 to emphasize the aspects thereof pertinent to the present invention.

As will become more apparent below, the mobile telecommunications domains 20A–20C comprise a mobile subscriber number portability domain. In the number portability domain, mobile subscribers can change service providers, e.g., change from one of the domains to another, e.g., change from domain 20A to domain 20C, and still maintain their "directory" or MSISDN number. "Portability", when used in connection with a mobile subscriber, involves the relocation of the data storage place for the mobile subscriber. When a mobile subscriber changes from one service provider to another, the change involves moving the data for the changing subscriber to one of the home location registers (HLR) of the new service provider/operator.

Figure 1B:
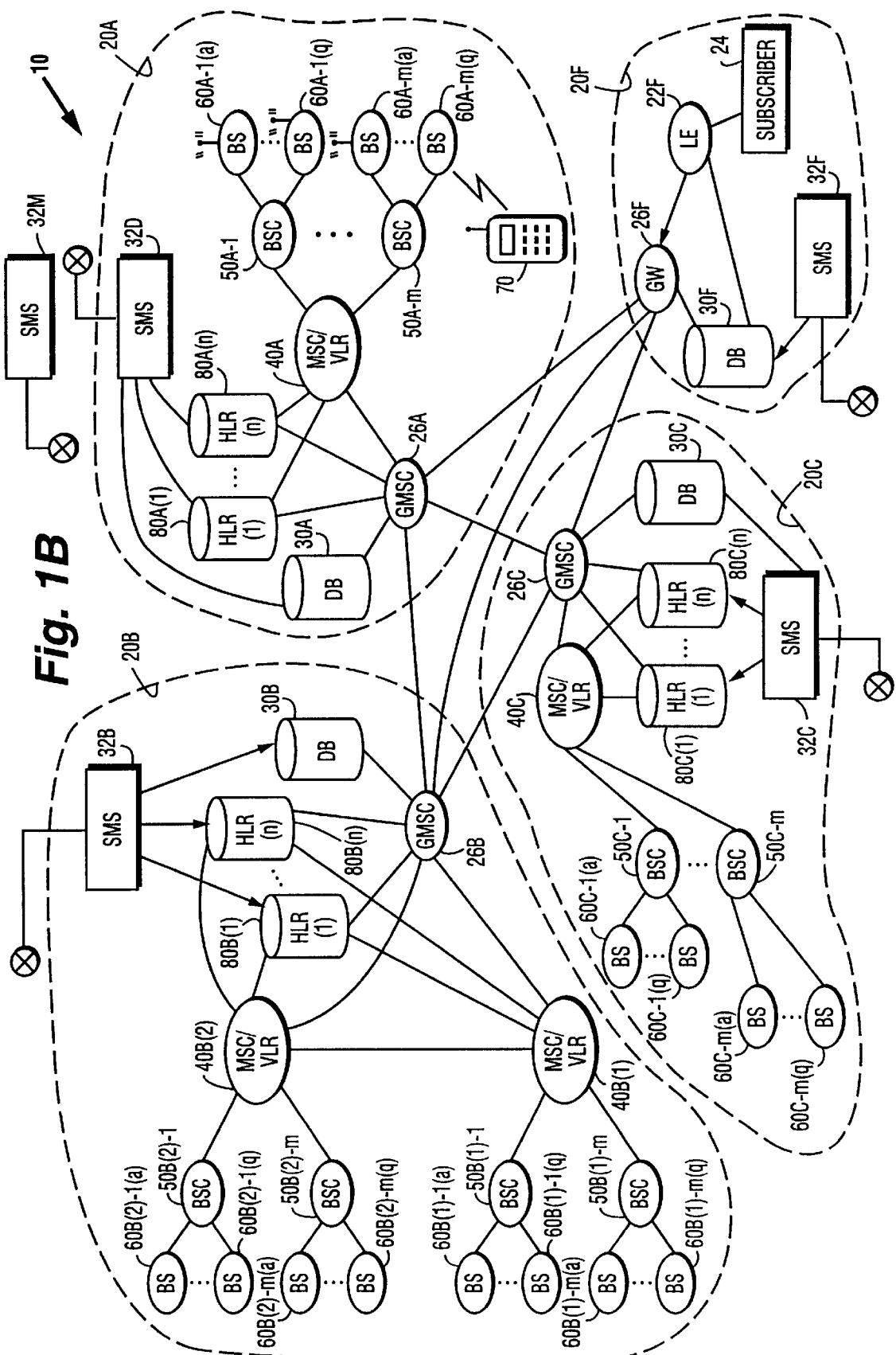
FIG. 1B is a schematic view of a telecommunications system according to another embodiment of the present invention with a mobile subscriber subscribing to a first service provider.

FIG. 1B shows another embodiment of the network of FIG. 1A, but additionally shows that local exchange LE 22F is connected to and queries database 30F. In all other aspects, the embodiment of FIG. 1B is similar to that of FIG. 1A.

A subscriber's MSISDN is a number which uniquely identifies a mobile telephone subscription in the public switched telephone network numbering plan. According to the CCITT recommendations, the mobile telephone number or catalogue number to be dialed is composed in the following way:

MSISDN=CC+NDC+SN

CC=Country Code

NDC=National Destination Code

SN=Subscriber Number

A National Destination Code is allocated to each domain 20 (e.g., to each GSM/PLMN [Global System for Mobile Communication/Public Land Mobile network]). In some countries, more than one NDC may be required for each domain 20. The international MSISDN number may be of variable length. The maximum length of the MSISDN number is 15 digits. The length of the MSISDN depends on the structure and numbering plan of each operator, as an application of CCITT recommendation E.164. For example, when a Swedish PSTN subscriber calls a Swiss OSM PLMN subscriber, the following digits shown in Table 1 are dialed. In Table I, the digits 89 define the 2 or 3 digits which identify the GSM PLMN area code; the digits 902147 define the 6 digits which identify the mobile subscriber.

TABLE 1

| International Prefix in Sweden | Country Code | National Destination Code | Subscriber Number |
|---|---|---|---|
| 009 | 41 | 89 | 902147 |

Communications and signalling occurs between domains 20 of FIG. 1A and their components. Telecommunications models have been created for standardized descriptions of different cases of information transfer in networks such as network 10 of FIG. 1A. One such model is the Open System Interconnection (OSI) model, which is structured in well-defined and specified layers which are each completely independent of the others. Like the OSI model, the CCITT Signalling System No. 7 is also structured in layers. The first such layer is the physical level, which is the interface to the information bearer, the signaling network. The first layer converts the zeroes and ones of a frame into pulses of the right size and shape and transmits them over a line. The second layer concerns fault handling, and has functions for separating messages, fault detection and correction, detection of signaling link faults, etc. The third layer concerns addressing and message handling (e.g., distribution and routing), and contains functions for ensuring that the message gets to the correct exchange, and functions for checking the network and maintaining transmission capabilities. The fourth layer is the user part, and is designed so that several different users can use the same signaling network.

Figure 10:
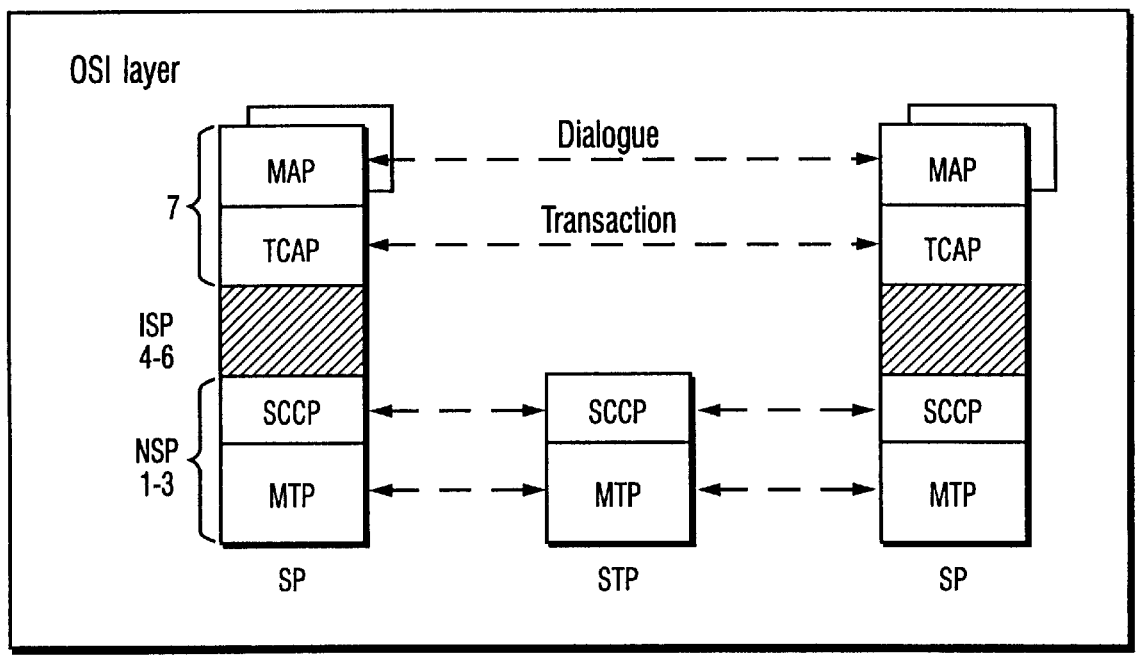
FIG. 10 is a schematic view of layers of information transfer in the system of FIG. 1A in accordance with an Open System Interconnection (OSI) model.

CCITT Signalling System No. 7 includes a number of functional parts, including a Message Transfer Part (MTP) and a number of different user parts. As shown in FIG. 10, the Message Transfer Part (MTP) resides in the first three layers. The Message Transfer Part (MTP) serves as a common transport system for reliable transfer of signalling messages between signalling points and is independent of the content of each User Part message. Thus, the responsibility of the MTP is to convey signalling messages from one User Part to another User Part in a reliable way. Each user part contains the functions and procedures which are particular to a certain type of user of the signalling system. Examples of user parts are the Telephone User Part (TUP), the Data User Part (DUP), the ISDN User Part (ISUP), and the Mobile Telephone User Part (MTUP).

In the OSI layer organization, CCITT 1984 introduced a Signalling Connection Control Part (SCCP) which provides additional functions to the Message Transfer Part (MTP) and which is situated above MTP in the OSI layering scheme [see FIG. 10]. The combination of MTP and SCCP is called the Network Service Part (NSP). The Network Service Part (NSP) meets the requirements for Layer 3 services as defined in the OSI Reference Model, CCITT Recommendation X.200. The SCCP is described in CCITT Recommendation Q.711–Q.716. The SCCP makes it possible to transfer both circuit related and non-circuit related signalling and user information between exchanges and specialized centers in telecommunications networks via a CCITT No. 7 network.

Layers 4–6 of the OSI model of FIG. 10 include the Intermediate Service Part (ISP). The Intermediate Service Part (ISP) is an element of the transaction capabilities which supports the Transaction Capabilities Application Part (TCAP) for connection-oriented messages. The Transaction Capabilities Application Part (TCAP) resides in layer 7 of the OSI model.

Figure 11:
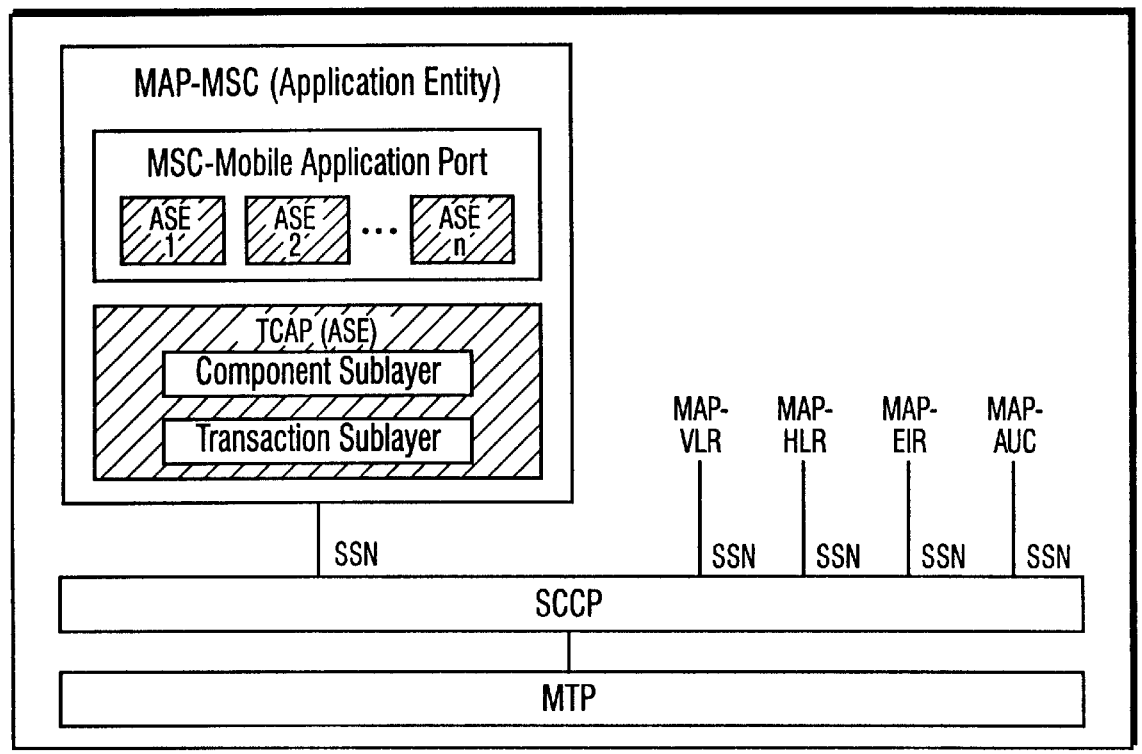
FIG. 11 is a schematic view of entities included in a Mobile Application Part of layer 7 of the OSI model of FIG. 10.

Also provided in layer 7, residing above the Transaction Capabilities Application Part (TCAP), is the Mobile Application Part (MAP). The Mobile Application Part (MAP) provides the necessary signalling procedures required for information exchange between GSM networks (e.g., domains 20 of network 10 of FIG. 1A). As shown in FIG. 11, Mobile Application Part (MAP) is divided into five application entities (AEs): MAP-MSC, MAP-VLR, MAP-HLR, MAP-EIR, and MAP-AUC. The MSC is the Mobile Services Switching Center, which controls calls to and from the other networks (e.g., PSTN, ISDN, PLMN, public data networks, and possibly, various private networks). The VLR is the Visitor Location Register which, as previously mentioned, is a data base containing information about all visiting mobile stations located in the MSC area. The AUC is the Authentication Center which is connected to the HLR and which provides the HLR with authentication parameters and ciphering keys for security purposes. The EIR is the Equipment Identity Register, which contains the hardware number of the equipment. These are all assigned one Sub-System Number (SSN) each. The SSNs are used by the SCCP to address the corresponding domain network entity (AE).

Examples of operations performed in the Mobile Application Part (MAP) are the following: updating of location of a mobile station; location cancellation for a mobile station; providing a roaming number for a visiting mobile station; inserting subscriber data; deleting subscriber data; sending parameters; activating supplementary services; and performing handovers.

The Mobile Switching Exchanges (MSC) 40 and base station controllers 50 are connected by PCM links. Apart from a number of speech/data channels, there are also time slots reserved for signalling. Signalling data in connection with call set-up, handover, release, etc., usually use this channel which can serve one or more base transceiver stations (BS) 60. The protocols used for the signalling between MSC and BSS are BSSAP (BSS Application Part), SCCP, and MTP.

Figure 2A:
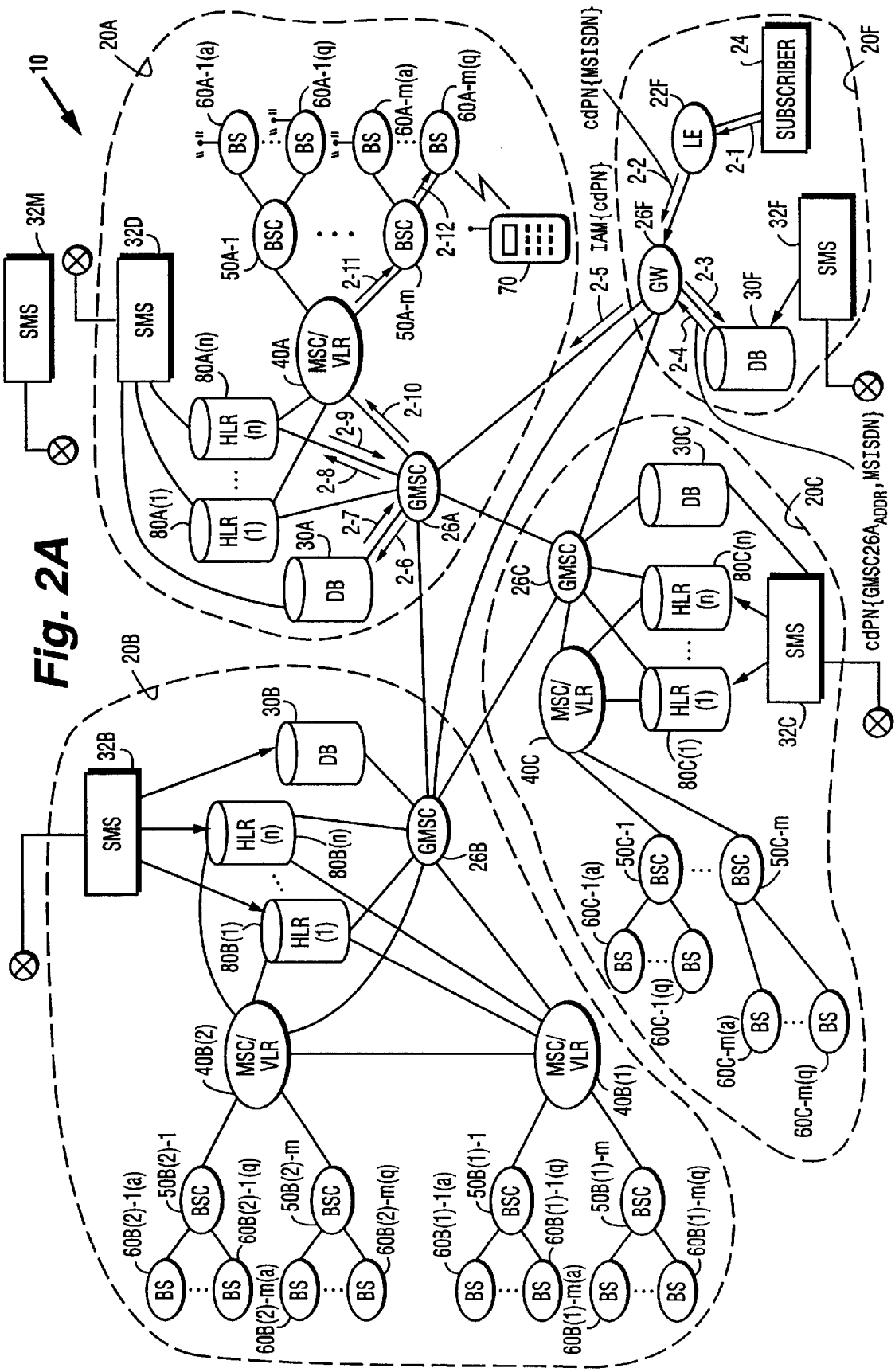
FIG. 2A is a schematic view of the telecommunications system of FIG. 1A and showing actions taken to call a mobile subscriber in accordance with a first mode of the invention.

FIG. 2A illustrates actions involved when subscriber 24 in fixed domain 20F places a call to a mobile subscriber in one of the mobile telecommunications domains 20, particularly to mobile subscriber 70 in mobile telecommunications domain 20A. Action 2-1 shows subscriber 24 dialing the directory number or MSISDN of mobile station 70 and the dialed directory number being routed to local exchange 22F. Action 2-2 shows local exchange 22F sending a routing message to gateway node 26F. In action 2-2, the MSISDN of mobile subscriber 70 is included in an address signal field of a routing message such as an ISUP called party parameter (CdPN). In FIG. 2A, the expression CdPN{MSISDN} is meant to indicate that the CdPN parameter includes the MSISDN value of mobile subscriber 70 in its address signal field.

Figure 12:
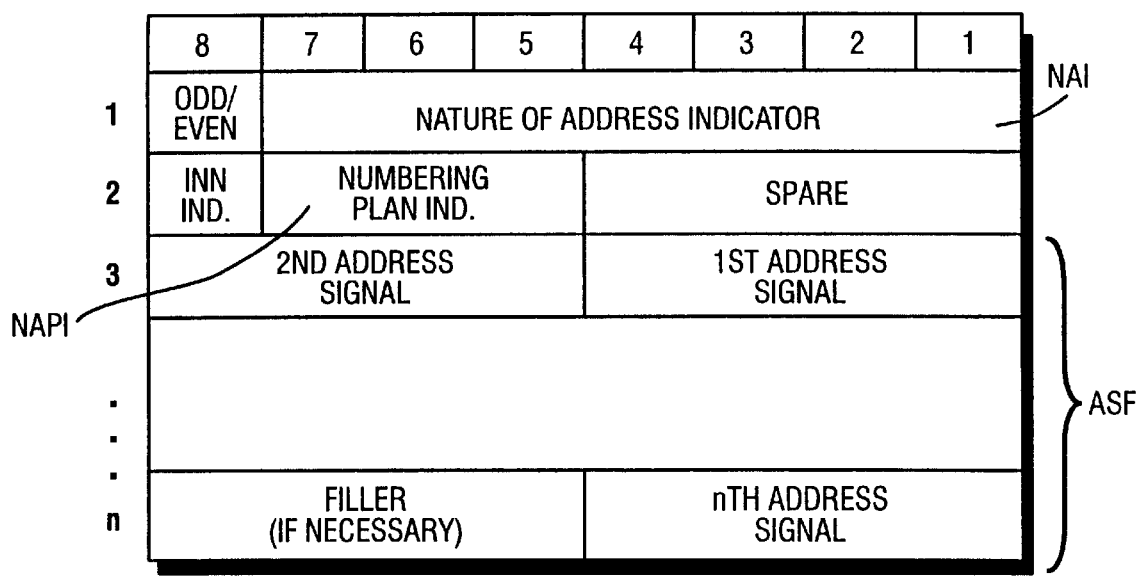
FIG. 12 is a schematic view of a format of an industry standard called party number parameter.

FIG. 12 shows the format of a called party parameter (CdPN) of the ITU-T Rec. Q.763 standard, an industry standard. The called party parameter (CdPN) is utilized to route calls between exchanges of a telecommunications system. The CdPN format of FIG. 12 includes a seven bit Nature of Address Indicator ("NAI") in its first byte; a Number Plan Indicator ("NAPI") in bits 5–7 of its second byte; and an Address Signal Field ("ASF") in its last n-3 bytes. The Number Plan Indicator ("NAPI") is a field that has one of 8 different values, and which indicates to what type of plan the called subscriber subscribes (e.g., ISDN or not). The Nature of Address Indicator ("NAI") is an ISUP parameter having one of 128 values, many of which are spare (i.e., not yet assigned). The NAI is conventionally employed to indicate such things as whether the number is a national number, and international number, etc. The Address Signal Field ("ASF") has n-2 number of four bit nibbles, each nibble representing an address signal. The most significant address signal is sent first, subsequent address signals are sent in successive 4-bit nibbles.

Gateway node 26F receives the routing message from local exchange 22F and, as indicated by action 2-3, sends the routing message with CdPN{MSISDN} to mobile subscriber number portability database 30F. Mobile subscriber number portability database 30F uses the MSISDN of mobile subscriber 70 to determine that mobile station 70 is currently served by GMSC 26A. Then, at action 2-4, mobile subscriber number portability database 30F returns to gateway node 26F a CdPN parameter that now includes both the address of GMSC 26A (GMSC26A$_{addr}$) and the MSISDN of mobile subscriber 70, i.e., CdPN{GMSC26A$_{addr}$, MSISDN}.

At action 2-5 gateway node 26F formulates and sends to GMSC 26A an initial routing message (IAM) which includes the CdPN parameter returned by mobile subscriber number portability database 30F. Then, at action 2-6, GMSC 26A queries database 30A using the MSISDN of mobile subscriber 70 to obtain a "Global Title" to be used for communication to the appropriate Home Location Register (HLR) 80A where data is stored for the called mobile subscriber 70. The Global Title or "GT" is an address in the SCCP part (see FIG. 10 and FIG. 11). Action 2-7 shows the HLR address being returned by database 30A to GMSC 26A. At action 2-8 GMSC 26A issues a send routing information operation (SRI) [which includes the address of the appropriate HLR obtained from database 30A as the Global Title] to the appropriate HLR [e.g., one of HLRs 80A(1) through 80A(n)] to get the necessary routing information. Action 2-9 shows HLR 80A(n) responding to the SRI operation with an SRI_response which returns the necessary routing information, e.g., the roaming number (MSRN) of the called mobile subscriber 70. As a result of receipt of the MSRN obtained at action 2-9, further actions are taken: action 2-10 shows the call being routed to MSC 40A; action 2-11 shows the call being routed to base station controller 50A-m; action 2-12 shows the call being applied to a transmitter of base transceiver station (BS) 60A-m(q); action 2-13 shows mobile subscriber 70 being paged by BS 60A-m(q) with the call.

It should be understood that, in conventional fashion, the determination by the HLR of the current MSC 40 which currently controls the called mobile subscriber 70 can involve other actions not specifically shown herein.

Moreover, it should also be understood that one or more signal transfer points (STPs) may be included between GMSC 26A and the HLRs, and that these STPs use the Global Title in the SCCP message to direct the SRI operation to the appropriate HLR.

Figure 2B:
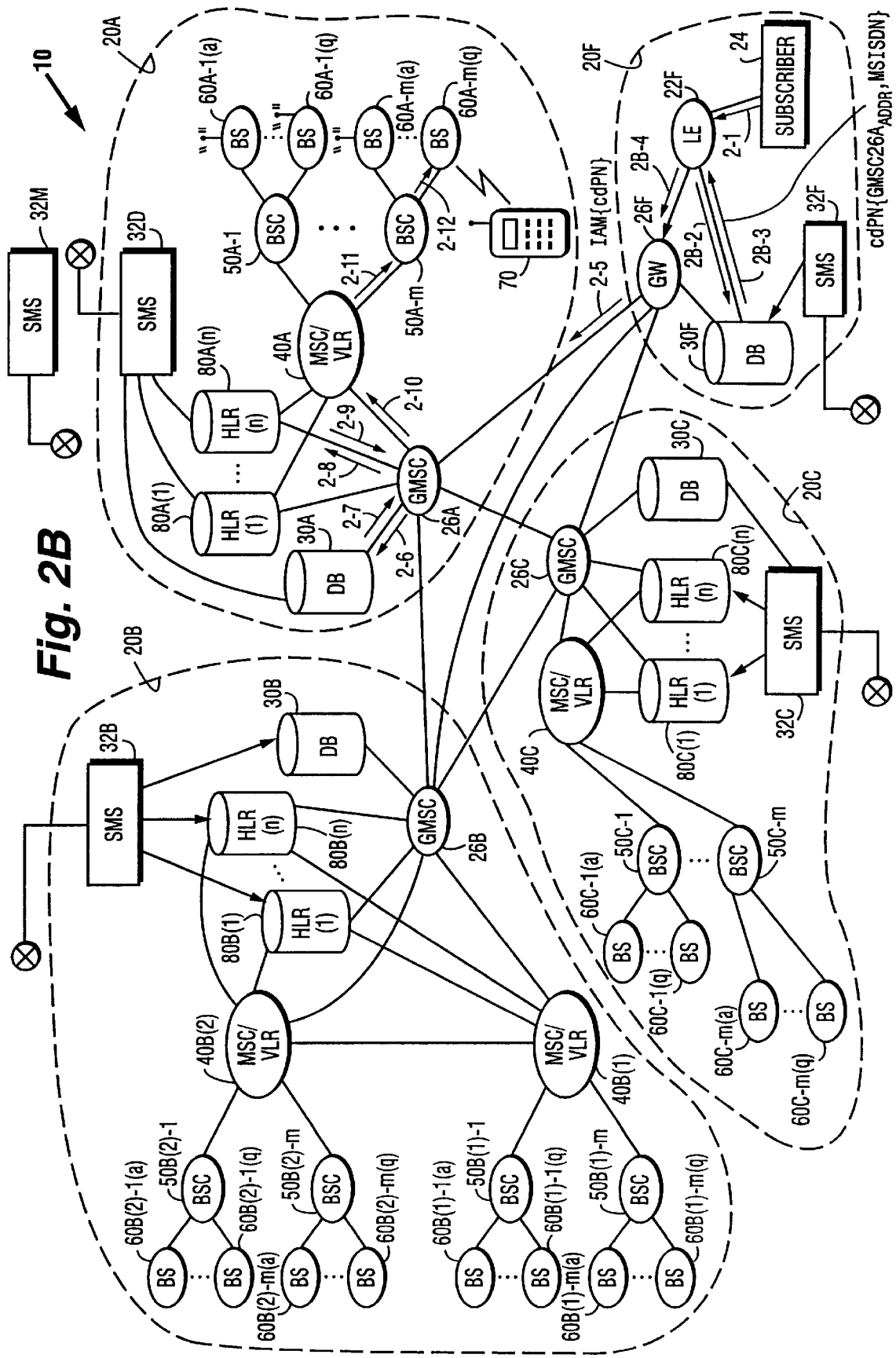
FIG. 2B is a schematic view of the telecommunications system of FIG. 1B and showing actions taken to call a mobile subscriber in accordance with a first mode of the invention.

FIG. 2B shows how the mode described above is performed in the network shown in FIG. 1B wherein local exchange 22F is connected to database 30F. After the called mobile subscriber's MSISDN is dialed at action 2-1, in FIG. 2B local exchange 22F queries database 30F with the MSISDN as indicated by action 2B-2. Database 30F then determines the address of the gateway node for the dialed MSISDN, and at action 2B-3 returns to local exchange 22F a CdPN parameter that now includes both the address of GMSC 26A (GMSC26A$_{addr}$) and the MSISDN of mobile subscriber 70, i.e., CdPN{GMSC26A$_{addr}$, MSISDN}. The returned CdPN is then relayed to gateway node 26F at action 2B-4. Thereafter the call is completed using the same actions 2-5 through 2-12 as shown in FIG. 2A.

Quering a local exchange such as local exchange 22f in the manner of FIG. 2B has the advantage that the services and charging (e.g., financial billing) output will have correct destination information (that was valid when the call was initiated). In this regard, a function known as "Outgoing Call Barring" or "OCB" needs to know the real destination of a call in order to screen calls for barring (i.e., precluding consummation of the call). The OCB function is presently performed by analyzing the CdPN parameter at the local exchange, since the block number tells the destination network and geographical area of the call being placed. With the modification of the CdPN by databases 30 of the present invention, the OCB function performed at the local exchange needs to know the CdPN value returned from the database. Thus, querying of the database by the local exchange facilitates accurate performance of the OCB function.

As a variation of FIG. 2B, it should be understood that any type of node of a call-originating network can be connected to and query a database such as database 30. Although examples of gateway nodes and local exchanges have been illustrated, other nodes such as transit exchanges can also perform the query function if properly connected to the database.

Figure 3:
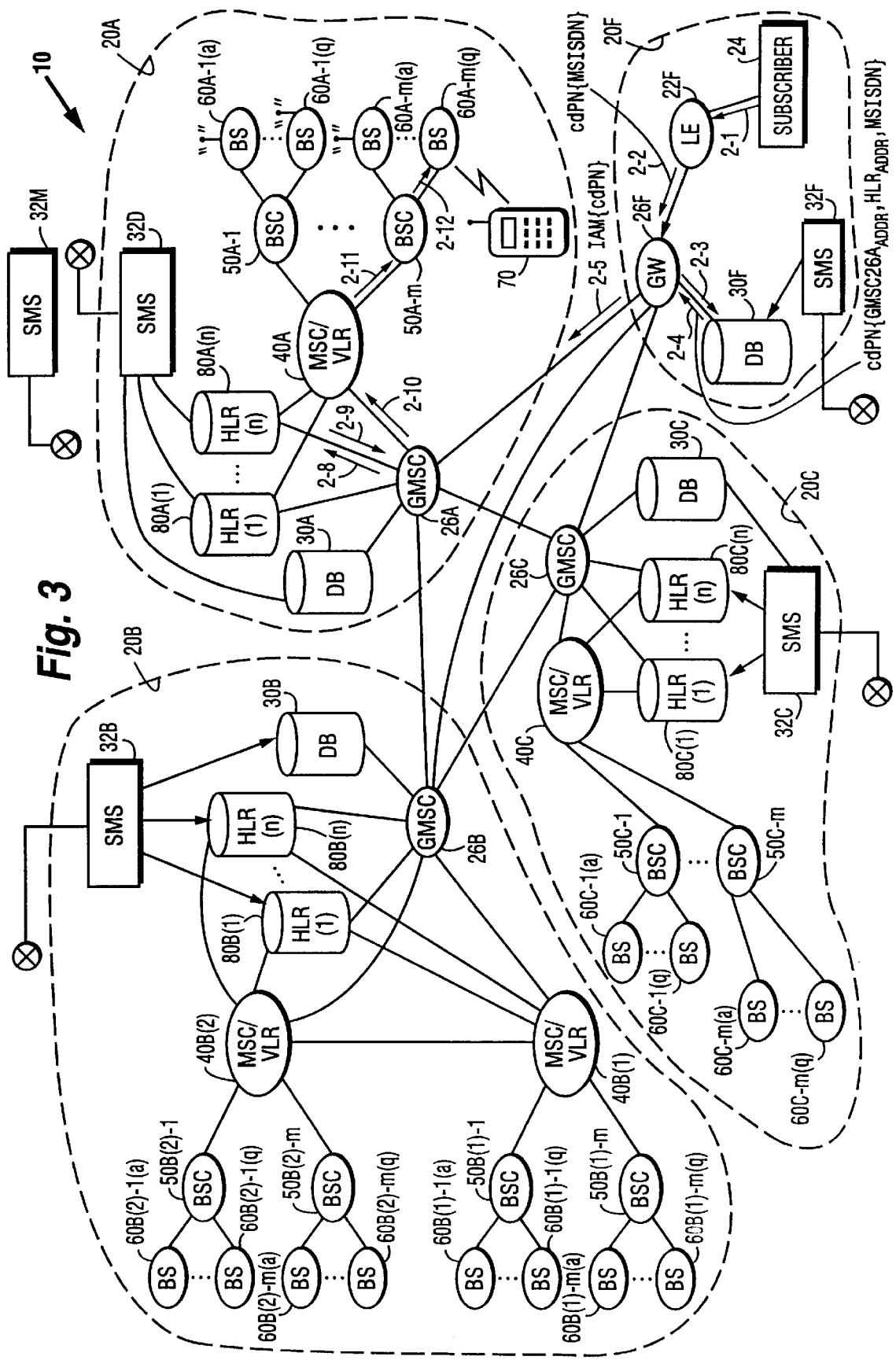
FIG. 3 is a schematic view of the telecommunications system of FIG. 1A and showing actions taken to call a mobile subscriber in accordance with a second mode of the invention.

FIG. 3 shows another mode of the invention wherein actions 2-1 through 2-3 are identical to comparably numbered actions described above with reference to FIG. 2A. However, in the mode of FIG. 3, upon receipt of the CdPN parameter at action 2-3, mobile subscriber number portability database 30F returns in action 2-4 not only the address of the GMSC for called mobile subscriber 70 and the MSISDN for mobile subscriber 70, but also the address of the HLR which serves mobile subscriber 70, i.e., HRL$_{ADDR}$ for HLR 80A(n). Thus, at action 2-4 the called party parameter CdPN includes the values GMSC 26A$_{ADDR}$, HRL$_{ADDR}$, and MSISDN, e.g., CdPN{GMSC26A$_{ADDR}$, HRL$_{ADDR}$, MSISDN}.

As a result of gateway node 26F knowing the address of HLR 80A(n) which serves mobile subscriber 70, actions 2-6 and 2-7 of FIG. 2A are obviated in the mode of FIG. 3. The actions of the mode of FIG. 3 then continue in like manner as with actions 2-8 et seq. of FIG. 2A, with the Global Title being sent in action 2-8 to HLR 80A(n) at the HLR address obtained from the initial routing message (IAM).

Thus, the mode of FIG. 3 involves storage in database 30F not only of the address of the GMSC serving the mobile subscriber 70, but also storage of the address of the particular HLR which handles mobile subscriber 70. Inclusion of the HLR address in database 30F, and consequentially in the initial routing message (IAM) sent at action 2-5, allows for faster access of the HLR. In some embodiments the HLR address is the IMSI number that is tied to the IMSI number as elaborated further herein, but such need not necessarily be the case.

Figure 1C:
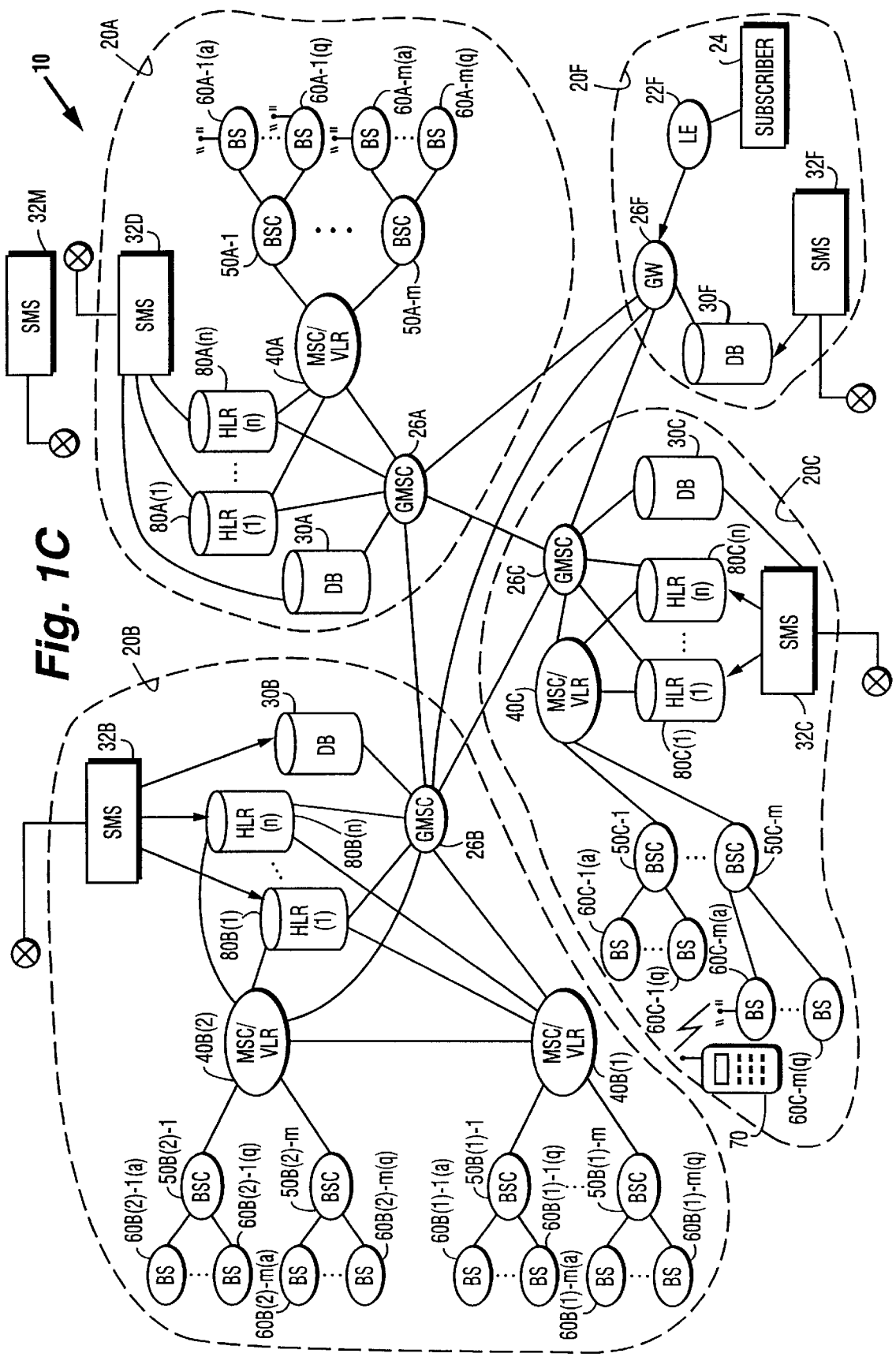
FIG. 1C is a schematic view of the telecommunications system of FIG. 1A but showing that a mobile subscriber has changed subscription from a first service provider to a second service provider.

FIG. 1C shows that mobile subscriber 70 has changed service providers. In particular, as seen in FIG. 1C, the subscriber of mobile subscriber 70 has changed his subscription from the provider which operates domain 20A to the provider which operates domain 20C. In fact, at the time shown in FIG. 1C, mobile subscriber 70 is served by MSC 40C and has its home location register as HLR 80C(1).

Upon the change of subscription depicted by FIG. 1C, deletion of the subscriber (owning mobile subscriber 70) from MSC 40A and HLR 80A(n) was communicated to service management system (SMS) 32A, which advised master service management system (SMS) 32M. SMS 32M subsequently communicated the deletion of the subscriber to all SMSs 32, including SMSs 32B, 32C, and 32F, which in turn updated respective databases 30B, 30C, and 32F, accordingly. Then, when the subscriber joined the service provider which operates domain 20C, SMS 32C advised master SMS 32M of the enlistment. SMS 32M subsequently advised all SMSs 32 of the enlistment in domain 20C of the subscriber, including SMSs 32A, 32B, and 32F, which in turn updated respective databases 30A, 30B, and 30F, accordingly. For the second mode implementation, the databases must be advised of the Global Title routing information in which to find the correct HLR. Importantly, upon changing service providers to domain 20C, the subscriber of mobile station 70 retains the same directory number or MSISDN which he had when he formerly was a member of domain 20A.

Figure 4:
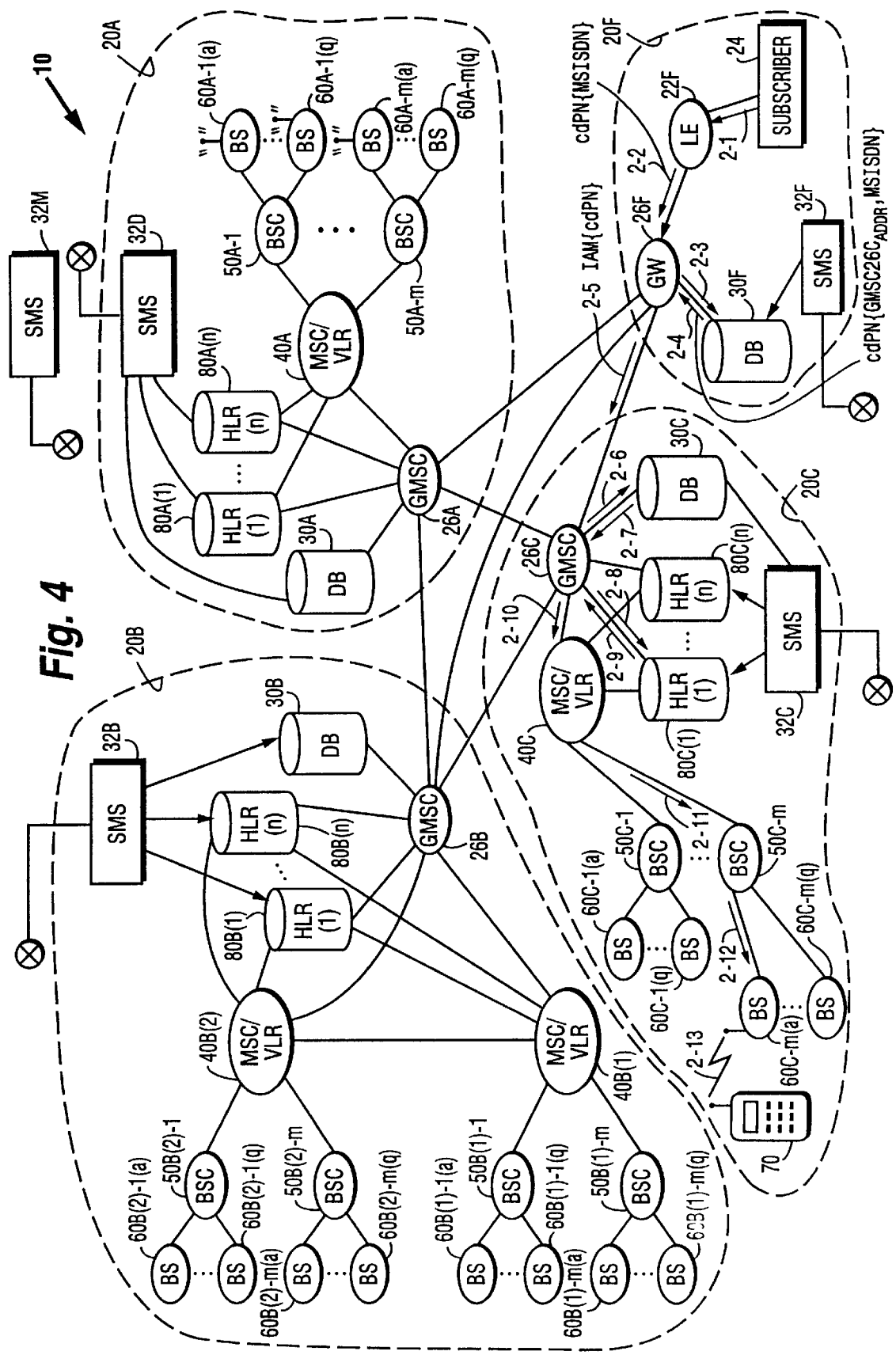
FIG. 4 is a schematic view of the telecommunications system of FIG. 1C and showing actions taken to call a mobile subscriber in accordance with a first mode of the invention.

FIG. 4 shows placement of a call from subscriber 24 in fixed domain 20F to mobile subscriber 70 (now in domain 20C as shown in FIG. 1C). Actions 2-1 through 2-3 as shown in FIG. 4 are identical to comparably numbered actions described above with reference to FIG. 2A. However, in view of the updating of database 30F to reflect the mobile subscriber 70 changing service providers, the called party parameter returned by database 30F at action 2-4 includes the address of the new GSMC 26C, not the address of the old GMSC 26A. Thereafter, the actions undertaken for call placement in FIG. 4 are comprehended with reference to actions already described above, it being understood that the subscriber of mobile station 70 is now being served by GMSC 26C and particularly MSC 40C and BSC 50C-m. Although not expressly illustrated, it should also be understood that a mode similar to that of FIG. 3 can also be performed with respect to FIG. 4, so that database 30F includes in the called party parameter the address of the appropriate HLR [e.g., the address of HLR 80C(1)], thereby obviating steps 2-6 and 2-7 as above discussed with reference to FIG. 3.

In the foregoing examples, for sake of illustration database 30F has returned the GMSC address and MSISDN, and in the second mode the HLR address, as part of the called party parameter CdPN, particularly in the Address Signal Field (ASF) thereof. It should be understood, however, that an important aspect of the present invention is that database 30F return the GMSC address, the MSISDN, and (in the second mode) the HLR address in a manner usable by gateway node 26F. Accordingly, insertion of these addresses and MSISDN is not confined to the Address Signal Field (ASF) of the CdPN parameter, or even to the CdPN parameter. Rather, these addresses and the MSISDN can be applied to gateway node 26F in other forms, such as in other parameters permitted by the particular protocol being implemented.

Figure 13:
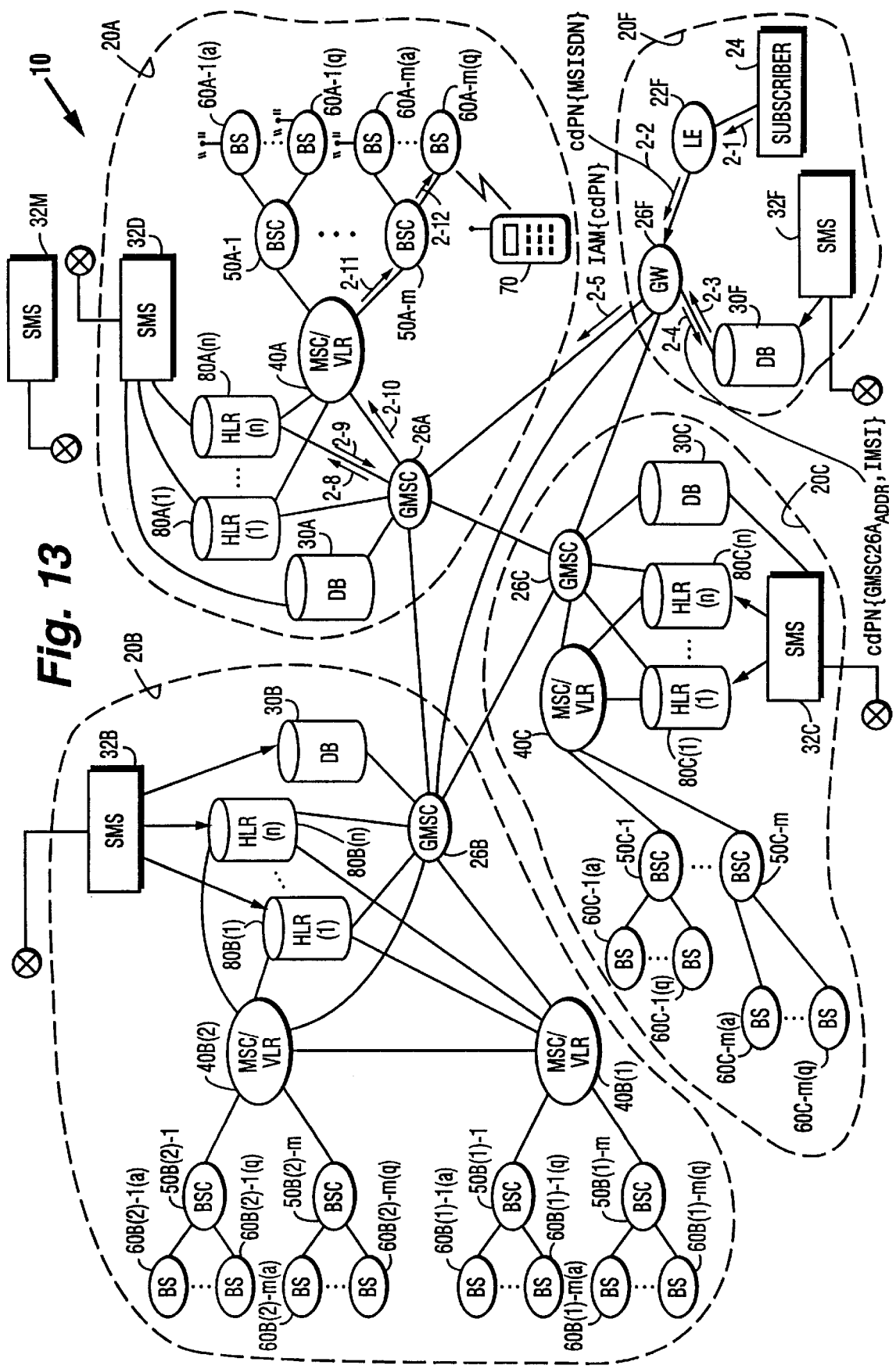
FIG. 13 is a schematic view of the telecommunications system of FIG. 1A and showing actions taken to call a mobile subscriber in accordance with a mode of the invention in which a database returns the mobile subscriber's international mobile subscriber number (IMSI).

In another embodiment shown in FIG. 13, the response from the mobile subscriber number portability database (depicted by action 2-4 in FIG. 13) is the address to the GMSC (an E.164 number) and the international mobile subscriber number (IMSI), i.e., the MSISDN need not be transported further. As is commonly understood, IMSI consists of three different parts: MCC, MNC, and MSIN. MCC is a Mobile Country Code (3 digits); MNC is a Mobile Network Code (2 digits); and MSIN is a Mobile Station Identification Number (11 digits maximum). Since the IMSI is obtained from the database, the IMSI is then used in action 2-8 for addressing the HLR from the GMSC, thereby obviating actions 2-6 and 2-7 shown in other modes. The GMSC address is carried in the CdPN as a prefix to IMSI or the IMSI is carried in a separate (optionally new) ISUP parameter which GMSC understands. In the embodiment of FIG. 13, the receiving mobile network need not consult its NAPs to determine the HLR address. The returned IMSI number is then the same IMSI as the one used from locating the HLR in the location update operation.

The foregoing examples have shown a call originated by subscriber 24 in fixed domain 20F. It should be understood that similar actions as those described above occur when a mobile subscriber places a call to another mobile subscriber. In such instance, the gateway node serving the originating mobile subscriber queries its database 30 to determine e.g., the address of the gateway node (GSMC) for the called mobile subscriber, and that subsequent actions resemble those illustrated above.

It should be understood that the term "address", used for example with reference to GSMC address and HLR address, can also be a node identifier.

Whereas the mobile subscriber number portability databases 30 are illustrated as being separate and distinct from the gateway nodes 26, in other embodiments the mobile subscriber number portability databases 30 are included as components of the gateway nodes 26 and accordingly do not involve any external signalling.

Figure 5:
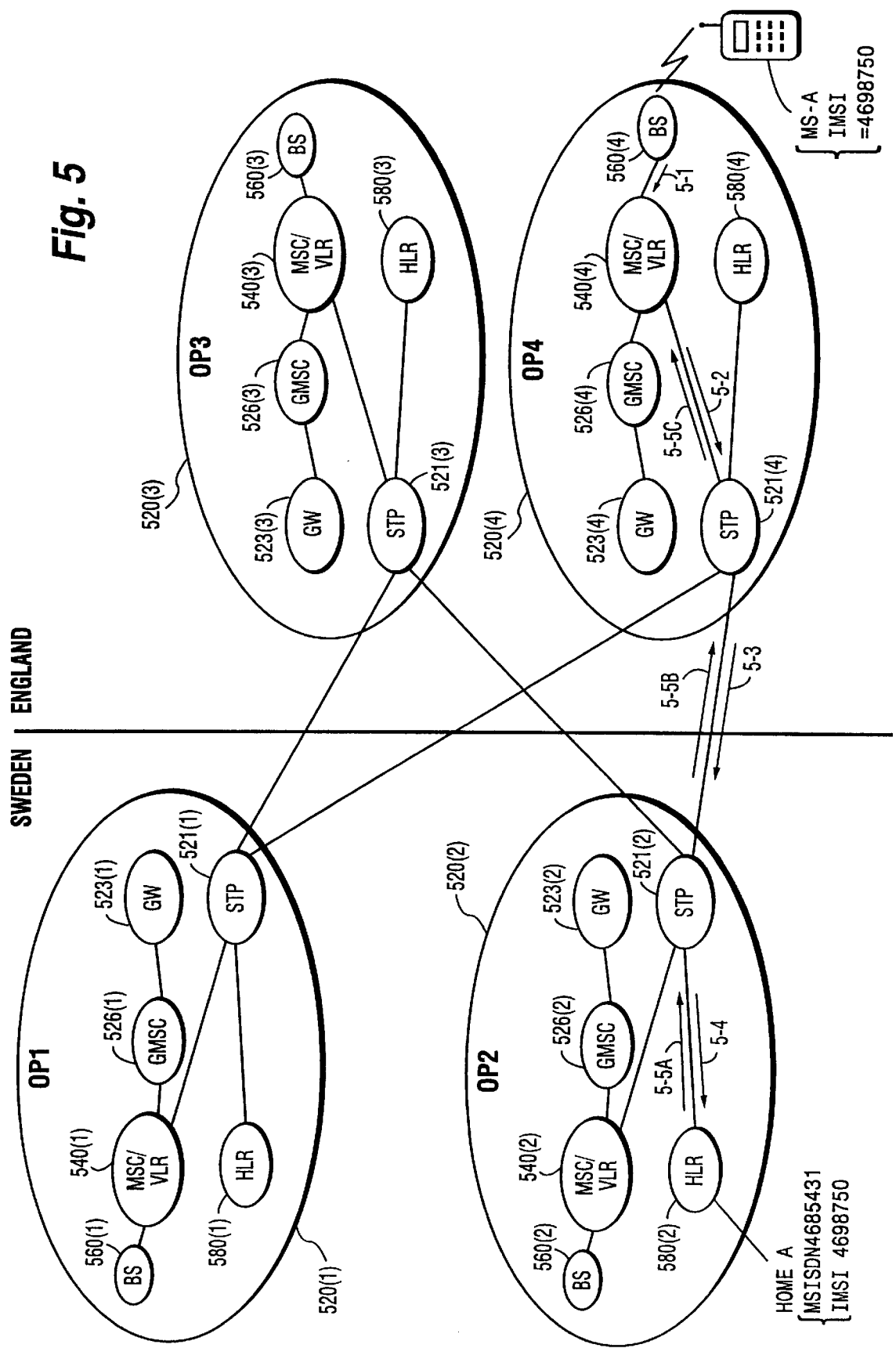
FIG. 5 is a schematic view of an international telecommunications network and showing actions performed during a registration/location update operation when a mobile subscriber of a service provider/operator in a first country is visiting in a second country.

FIG. 5 shows an international telecommunications network with service providers/operators in two countries. In particular, FIG. 5 shows service provider/operators OP1 and OP2 serving domains 520(1) and 520(2), respectively, in Sweden, as well as service provider/operators OP3 and OP4 serving respective domains 520(3) and 520(4) in England.

For sake of simplicity, each domain is shown as having representative constituent elements including a signal transfer point (STP) 521; a gateway node 523; a GMSC 526; a MSC/VLR 540; a base station 560; and, a home location register (HLR) 580. For each domain, these representative constituent elements are labeled with parenthesized suffixes which correspond to the parenthesized suffixes of the domains, e.g., STP 520(1) for domain 520(1), etc. For clarity, only representative constituent elements are shown in FIG. 5, and it should be understood that pluralities of these elements and yet further elements can reside in each domain.

The service provider/operators OP1–OP4 of the network of FIG. 5 can have various ones of their STPs 521 connected together. For example, STP 521(1) is shown as being connected to STP(3) and STP(4), and similarly STP 521(2) is shown as being connected to STP(3) and STP(4). Although not shown in FIG. 5, it should be further understood that gateways GW 523 of the various domains are also connected. GMSCs within a domain are also connected to one another.

FIG. 5 further indicates that a mobile station MS-A, belonging to a subscriber of OP2 which operates domain 520(2) in Sweden, has entered England and just been activated. FIG. 5 further shows actions involved in a registration/location update procedure for mobile station MS-A.

At action 5-1, mobile station MS-A is seen sending its international mobile subscriber number (IMSI) to base station 560(4) of OP4. As previously mentioned, IMSI consists of three different parts: MCC, MNC, and MSIN. MCC is a Mobile Country Code (3 digits); MNC is a Mobile Network Code (2 digits); and MSIN is a Mobile Station Identification Number (11 digits maximum). In the example shown in FIG. 5, mobile station MS-A has the particular number "4698750" as its IMSI.

MSC/VLR 540(4) uses the IMSI sent from mobile station MS-A as global title (GT) and orders the SCCP to route a location update message to the mobile subscriber's HLR. The MCC portion of the IMSI indicates that the HLR is in Sweden; the MNC portion of the IMSI indicates that the HLR is in OP2 (as opposed e.g., to OP1). Action 5-2 shows the location update message being forwarded from MSC/VLR 540(4) to STP 520(4); action 5-3 shows forwarding from STP 520(4) of OP4 to STP 520(2) of OP2; action 5-4 shows forwarding from STP 520(2) to HLR 580(2).

Upon receipt of the location update message, HLR 580(2) uses the MSIN in the IMSI to determine the MSISDN for the mobile subscriber of station MS-A. HLR 580(2), which serves the subscriber of mobile station MS-A, responds with a "location update accepted" message. Action 5-5a shows the "location update accepted" message being forwarded to STP 521(2); action 5-5b shows the "location update accepted" message being forwarded to STP 521(4); action 5-5c shows the "location update accepted" message being forwarded to MSC/VLR 540(4). Thereafter, further communications between OP4 and HLR can occur. For example, the VLR of MSC/VLR 540(4) fetches the MSISDN of the subscriber which owns mobile station MS-A.

Once registration has occurred, the registered mobile subscriber can make and receive calls. Ordinarily, the registered mobile subscriber's MSISDN is used as global title. However, usage of MSISDN as global title is not necessary if a mobile subscriber number portability database according to the present invention is employed. For example, MSISDN can be deleted from global title if, upon consultation of the mobile subscriber number portability database, the IMSI of the registered mobile subscriber is included in the network routing number (NRN) obtained from the NP database for routing to the HLR. Such replacement of MSISDN with IMSI can be either on SCCP routing to HLR and optionally also the routing to GMSC since the IMSI implicitly states the serving home network.

Figure 6:
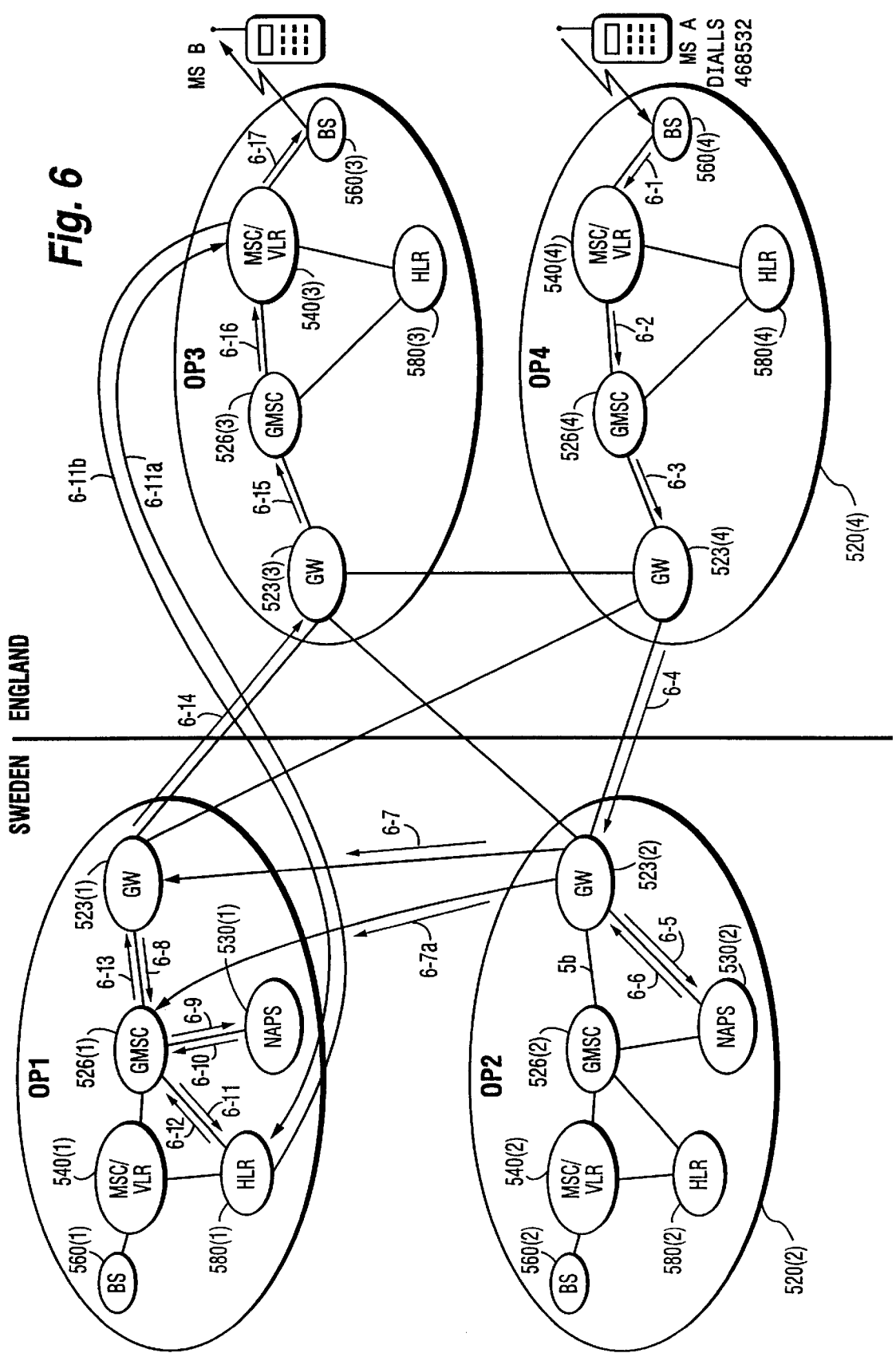
FIG. 6 is a schematic view of an international telecommunications network and a mode of connecting a call between two visiting mobile subscribers in a foreign country, and wherein a gateway node is connected to mobile subscriber number portability database.

FIG. 6 shows that domains 520(1) and 520(2) of FIG. 5 further include mobile subscriber number portability databases 530(1) and 530(2), respectively. FIG. 6 depicts domains 520(3) and 520(4), in contrast, as not having mobile subscriber number portability databases. Furthermore, in FIG. 6 it is presumed that mobile station MS-A of FIG. 5 (having MSISDN 4685431 and subscribing to OP2 in Sweden), after registration/location update in the manner described with respect to FIG. 5, dials a MSISDN of "468532" in order to reach mobile station MS-B. Mobile station MS-B, also travelling in England, formerly subscribed to OP2 in Sweden but now subscribes to Swedish operator OP1 and has already registered with its HLR and has a roaming number known to MSC/VLR 540(3).

Figure 7:
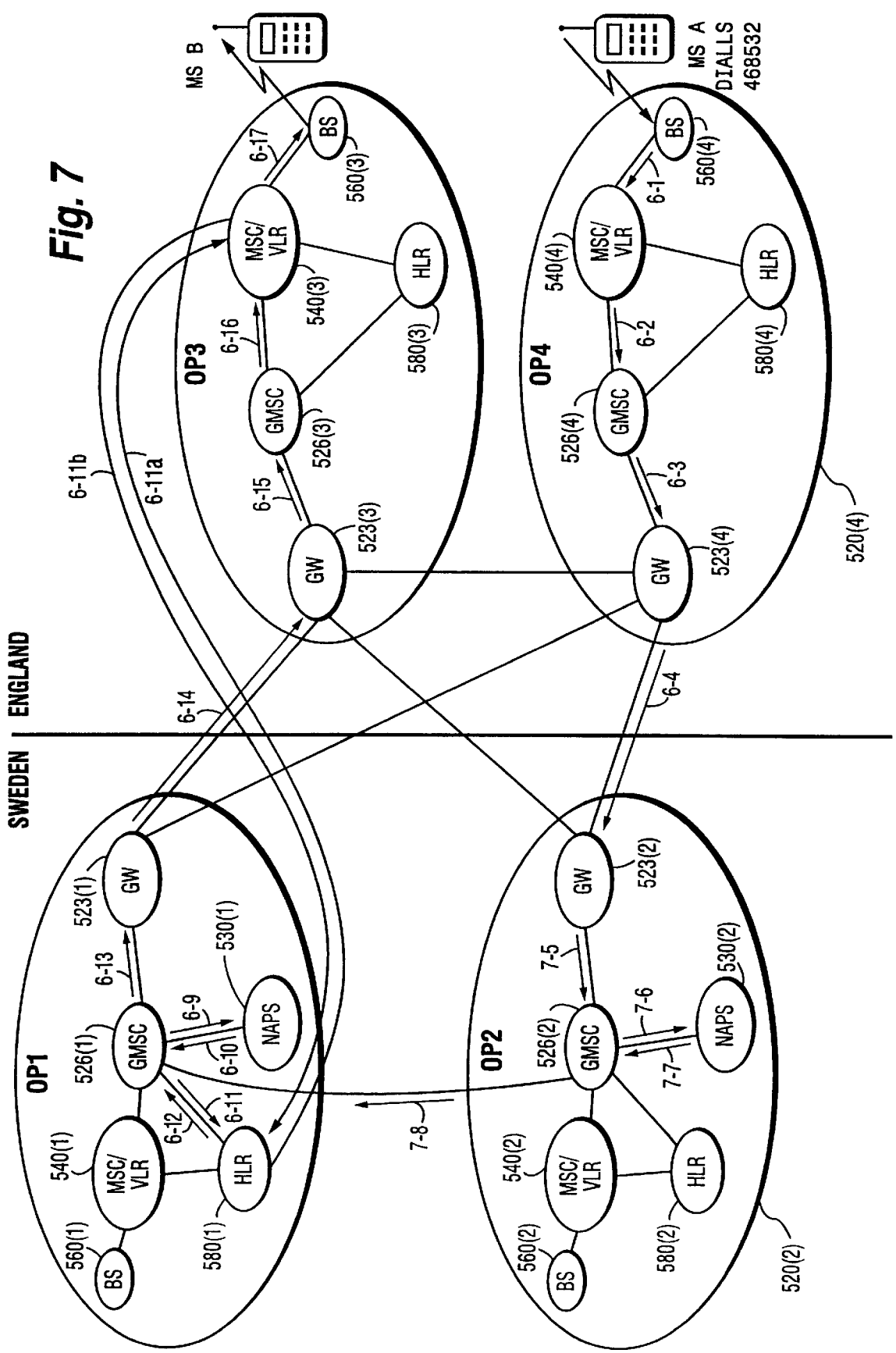
FIG. 7 is a schematic view of an international telecommunications network and a mode of connecting a call between two visiting mobile subscribers in a foreign country, and wherein a gateway node is not connected to mobile subscriber number portability database.

FIG. 6 and FIG. 7 show actions performed in connecting a call from a first visiting mobile station in a foreign country (e.g., the subscriber of MS-A) to a second visiting mobile station in the foreign country (e.g., the subscriber of MS-B), after the subscriber of the called second mobile station has changed from a first service provider/operator in his native country (OP2) to a second service provider/operator in his native country (OP1). In the particular mode shown in FIG. 6, a gateway 523(2) of the first service provider/operator (OP2) is connected to mobile subscriber number portability database 530(2); in the mode shown in FIG. 7, gateway 523(2) of the first service provider/operator (OP2) is not connected to mobile subscriber number portability database 530(2). However, in the mode shown in FIG. 7, GMSC 526(2) is so connected to mobile subscriber number portability database 530(2).

As shown in FIG. 6, upon the dialing at mobile station MS-A of the MSISDN of subscriber B (as reflected by action 6-1), the MSC/VLR 540(4) determines that the MSISDN belongs to a Swedish subscriber (e.g., from the country code CC of the MSISDN) and that the series of the dialed digits historically belongs to OP2 in Sweden. However, unknown to MSC/VLR 540(4), the subscriber with the dialed MSISDN has changed from service provider/operator OP2 to service provider/operator OP1 and yet retained the MSISDN originally assigned by OP2. Action 6-2 shows the call being routed from MSC/VLR 540(4) to GMSC 526(4); action 6-3 shows the call being routed from GMSC 526(4) to gateway node 523(4); action 6-4 shows the call being routed from gateway node 523(4) of service provider/operator OP4 to gateway node 523(2) of service provider/operator OP2. By "call being routed", it should be understood that traditional routing messages are utilized, and that those routing messages include the MSISDN of called subscriber B.

Since gateway node 523(2) is connected to database 530(2), action 6-5 involves gateway node 523(2) making query to database 530(2) to determine to which domain the called subscriber B belongs. Since, as indicated above, subscriber B has changed his subscription from OP2 to OP1, action 6-6 shows database 530(2) returning to gateway node 523(2) a network routing number (NRN) which includes the address of the GMSC which servers subscriber B, particularly GMSC 526(1).

Action 6-7 shows the call [e.g., network routing number (NRN) inclusive of the address of GMSC which servers subscriber B and subscriber B' 's MSISDN] being relayed from gateway node 523(2) of domain 520(2) to gateway node 523(1) of domain 520(1). Action 6-8 shows the call being routed from gateway node 523(1) to subscriber B's GMSC 526(1). As indicated by action 6-7a, as an alternative to actions 6-7 and 6-8, the call can be directly routed from gateway node 523(2) of domain 520(2) to subscriber B's GMSC 526(1) if connections so permit, thereby obviating action 6-7 and 6-8.

Action 6-9 shows database 530(1) being queried by GMSC 526(1), if necessary, to obtain the address of the HLR serving subscriber B. Action 6-9 may not be necessary if the HLR address is earlier discovered, e.g., at database 530(2), and earlier included in the network routing number. Action 6-10 shows the address of the HLR which serves subscriber B being returned to GMSC 526(1).

At action 6-11, GMSC 526(1) queries subscriber B's HLR [i.e., HLR 580(1)] to determine the location of subscriber B. Upon being queried, HLR 580(1) in turn queries MSC/VLR 540(3) of domain 520(3), as indicated by action 6-11a. In response, MSC/VLR 540(3) returns to HLR 580(1) the necessary information (e.g., the roaming number of subscriber B's mobile station MS-B). Action 6-12 shows subscriber B's roaming number being forwarded to GMSC 526(1). For sake of simplicity, action 6-11a and action 6-11b are illustrated as if HLR 580(1) were directly connected to MSC/VLR 540(3), which is not the case. Rather, the inquiry for the roaming number of subscriber B and return of subscriber B's roaming number is conducted through GMSC 526(1), gateway node 523(1), gateway node 523(3), and GMSC 526(3) in the manner understood by those skilled in the art.

Actions 6-13 through 6-17 then show the call being routed to domain 540(3) so that mobile station MS-B receives a page and rings. In this regard, the call including roaming number is forwarded from GMSC 526(1) to gateway node 523(1) [action 6-13]; from gateway node 523(1) to gateway node 523(3) [action 6-14]; from gateway node 523(3) to GMSC 526(3) [action 6-15]; from GMSC 526(3) to MSC/VLR 540(3) [action 6-16]; and, from MSC/VLR 540(3) to base station 560(3) [action 6-17].

The actions shown in FIG. 7 differ from those shown in FIG. 6 only to that gateway node 523(2) is unable to query database 530(2) directly. Actions identical to those shown in FIG. 6 are shown in FIG. 7 with the same corresponding reference numbers, including action 6-1 through 6-4 and 6-9 through 6-17. However, after receipt of the call at action 6-4, gateway node 532(2), at action 7-5 the call is routed to GMSC 526(2), since GMSC 526(2) has access to database 530(2). Action 7-6 shows database 530(2) being queried to determine to what domain subscriber B currently belongs and the address of the GMSC handling subscriber B. A response, in this case pointing to domain 520(1) and having the address of GMSC 526(1), is returned by database 530(2) to GMSC 526(2) at action 7-7. Action 7-8 shows the call to subscriber B being routed to GMSC 526(1). Thereafter, the actions of FIG. 7 are identical to those of FIG. 6, with the address of subscriber B's HLR being determined, if necessary; subscriber B's HLR determining subscriber B's roaming number; and, the call being routed to domain 520(3) to MS-B.

U.S. patent application Ser. No. 08/739,930, filed Oct. 18, 1996, which is incorporated herein by reference, shows embodiments of telecommunications networks which facilitate portability of telephone subscriber numbers. Therein, various embodiments include a plurality of physical nodes or exchanges between which calls are connected and a subscriber location server which is connected to and accessed by each of the plurality of exchanges in the domain. Each exchange has a unique exchange identifier (ID). Generally, when a call is placed to a subscriber in a portability domain, a first exchange which the call encounters queries the subscriber location server. When queried, the subscriber location server returns a Network Routing Number (NRN) which includes a Network Routing Prefix (NRP). The Network Routing Prefix (NRP) is a node identifier (NI) for the local exchange to which the called party is connected. The exchange to which the NRN is returned prepares a routing message for the call by including the Network Routing Prefix (NRP) in the Address Signal Field (ASF) of a routing message and by setting a number relocateability flag (NRF) in the routing message. In an embodiment in which the routing message is the industry standard called party number parameter (CdPN), the exchange sets a number relocateability flag (NRF) in an Nature of Address Indicator (NAI) field and replaces the former contents of the ASF with a concatenation of the NRP and the former contents of the ASF (e.g., the called party's directory number).

The subscriber location server has a changeable mapping of subscriber numbers and exchange identifiers. Subscriber directory numbers are not used for routing calls through the domain. Rather, the node identifier (NI) in the form of the Network Routing Prefix (NRP) is used to route calls to a terminating locating exchange.

A change of connection (e.g., relocation) of a called subscriber from a first exchange to a second exchange involves a remapping, in a database of the subscriber location server, of the subscriber number from an exchange identifier of the first exchange to an exchange identifier of the second exchange. Subscribers can move freely within the domain and retain the same directory number. The subscriber need not advise the public of a new directory number when the subscriber relocates.

When desired for such purposes of redundancy, loading sharing, or hierarchial structure, for example, a plurality of subscriber location servers can be employed.

In some embodiments a subscriber location server augmented with additional intelligence is known as a network number and address portability server (NAPS). A NAPS is particularly effective for providing additional network services. For example, the NAPS can be easily and economically utilized to perform a "look ahead" function. Moreover, with NAPS it is possible to define the same subscriber number in several local exchanges and then, in the subscriber location server, to make a determination as to which local exchange the call to such subscriber number should be routed. Such determination can be made on any of a number of bases, such the originating caller's geographies, time of day, calling party number, etc. It is also possible for the subscriber location server to route calls to different networks depending on the type of access being used by the called party at a certain moment, e.g., if a cellular phone is being used or a fixed phone.

Various embodiments also provide for number relocateability when changing from one operator or service provider to another (e.g., from a fixed to a GSM service provider and vice versa) and when changing access service types (e.g., from fixed POTS to ISDN or GSM). Thus, the relocateability features are not restricted to physical location relocateabililty.

Figure 8:
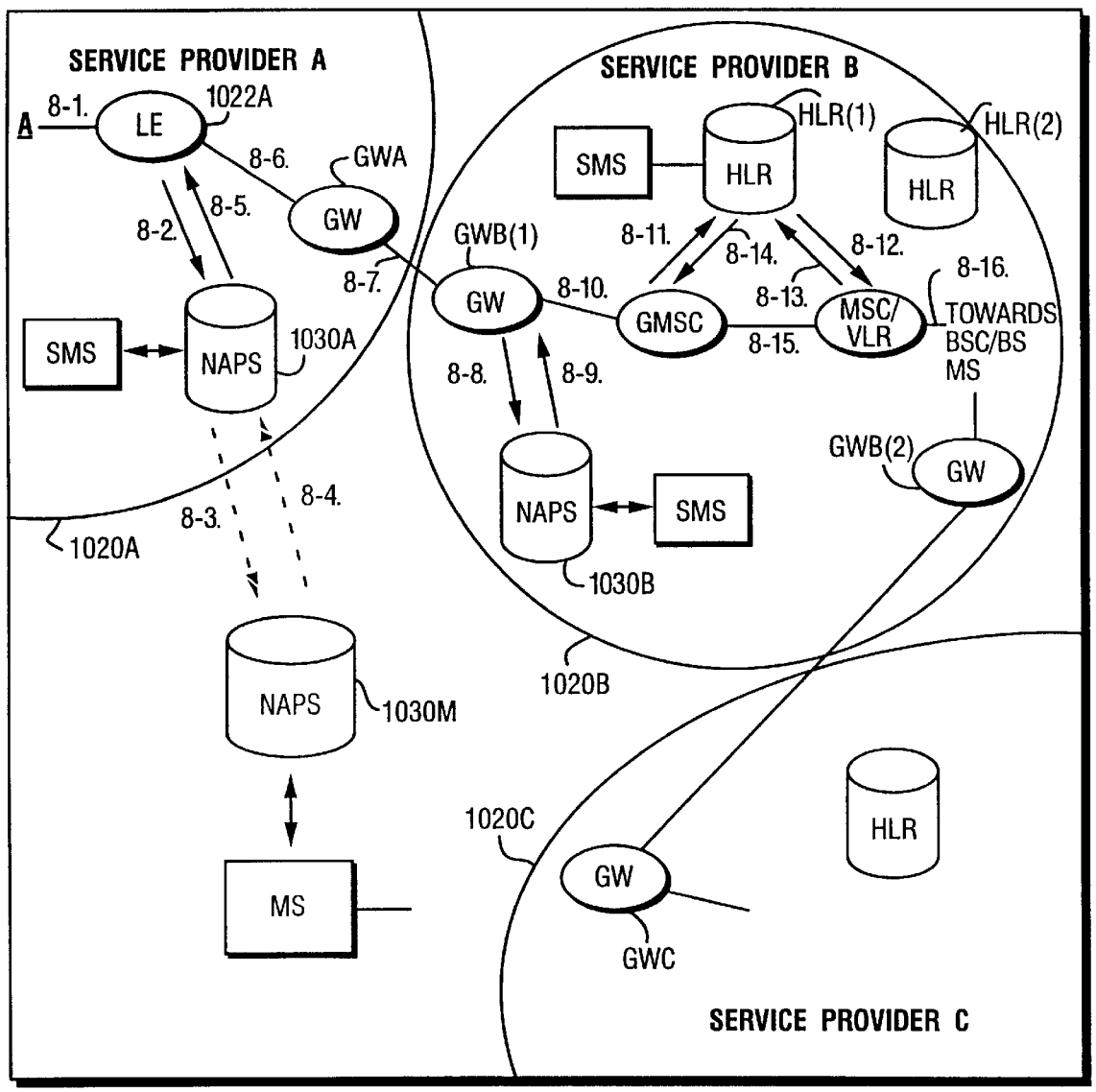
FIG. 8 is a schematic view of a plurality of domains maintained by different service providers, with one of the domains providing mobile telecommunications.

In the above regard, FIG. 8 shows a plurality of domains 1020A, 1020B, 1020C. The domains 1020A, 1020B, 1020C can each be maintained by a different service provider. Domain 1020B of FIG. 8 provides mobile telecommunications service. Domain 1020A has a gateway GWA which connects with gateway GWB(1) of domain 1020B and gateway GWC of domain 1020C; domains 1020B and 1020C are connected between gateways GWB(2) and gateway GWC.

Domain 1020A has a local exchange 1022A which connects to gateway GWA and to subscriber location server 1030A. Domain 1020B has gateways GWB(1) and GWB(2), gateway GWB(1) being connected to subscriber location server (NAPS) 1030B. For sake of simplicity no local exchange is shown in domain 1020C, although one or more local exchanges are included. Connected for accessability by all domains is master subscriber location server (NAPS) 1030M. Each of the subscriber location servers 1030A, 1030B, 1030C, and 1030M has an associated service management system (MS).

To facilitate the mobile communications, domain 1020B has a Gateway Mobile Switching Center (GMSC) and a Mobile Switching Center with Visiting Location Register (MSC/VLR). GMSC is connected by land lines to gateway GWB(1) and to the MSC/VLR, and to a Home Location Register HLR(1) and Home Location Register HLR(2). The MSC/VLR is also connected to both HLR(1) and HLR(2) by ITU-T signaling system no. 7, and to the GMSC by land lines. In addition, MSC/VLR is connected by land lines to BSC/BSMC (Base Station Controller/Base Station Short Message Server).

FIG. 8 illustrates a call made from fixed subscriber sub-A in domain 1020A towards a mobile GSM subscriber who has been ported from service provider C (serving domain 1020C) to service provider B (serving domain 1020B). Action 8-1 shows subscriber sub-A dialing the directory number of subscriber sub-B. At action 8-2, local exchange 1022A queries subscriber location server 1030A to determine a network routing prefix for subscriber sub-B based on the dialed directory number. Subscriber location server 1030A determines that the directory number for subscriber sub-B is not in the domain served by server 1030A. Consequently, as indicated by action 8-3, server 1030A sends a query to master server (NAPS) 1030M in order to determine the service provider who serves subscriber sub-B. Action 8-4 shows an address to the service provider of domain 1020B being returned to server 1030A, which in turn is forwarded at action 8-5 to local exchange 1022A. Then, at action 8-6, the call inclusive of the address of the service provider of domain 1020B is directed by local exchange 1022A to gateway GWA. Action 8-7 shows the routing or address message being transmitted between gateways GWA and GWB. Upon receipt of the address message, at action 8-8 gateway GWB queries the subscriber location server (NAPS) 1030B of domain 1030B to determine the node in domain 1020B to which subscriber sub-B is connected. When subscriber location server (NAPS) 1030B is queried, server 1030B returns, in action 8-9, a NRN including a Network Routing Prefix which is indicative of the Gateway Mobile Switching Center (GMSC). The address message is transmitted to the GMSC as indicated by action 8-10. The GMSC translates the mobile station ISDN number (MSISDN) in the address message to a Global Title used for addressing the HLR(1). Normally MSISDN is put in as the Global Title, but at this juncture a translation is needed for avoiding any updates in intermediate signal transfer points (STPs). This translation can be done internally in the GMSC or a query can be made to a database for the translation from MSISDN to a routing number used for GT addressing forwards to HLR(1). At action 8-11, the Home Location Register for subscriber sub-B (i.e., HLR(1)) is called by the GMSC. HLR(1) then calls the Mobile Switching Center with Visiting Location Register (MSC/VLR) [action 8-12], which selects and returns a roaming number to HLR(1) [action 8-13]. The roaming number is then, as reflected by action 8-14, passed to the GMSC. The GMSC uses the roaming number in the called party number parameter (CdPN) to address the MSC/VLR where subscriber sub-B resides [action 8-15]. Action 8-16 shows subscriber sub-B being paged using the international mobile subscriber number (IMSI).

It should be understood that each of the gateways in FIG. 8 are connected to the subscriber location servers (NAPS) of their respective domains in order to process address messages which are incoming to their respective domains. Moreover, it may occur for some calls made outside of a domain, such as frequently made calls, that subscriber location servers need not consult the master server (NAPS) 1030M if the master server 1030M downloads provider information to the domain server. In the example just described, actions 8-3 and 8-4 can be conducted internally by server 1030A if server 1030A has already stored an indication of the service provider for subscriber sub-B. Further, in a situation wherein actions 8-3 and 8-4 do involve consultation of master server 1030M, it is possible for master server 1030M to include in the routing or address message the node in domain 1020B for subscriber sub-B. That is, master server 1030M may include, in the address message returned at action 8-4, domain 1020B's NRP for subscriber sub-B if such is known by server 1030M. Inclusion of the receiving domain's prefix would obviate actions 8-8 and 8-9 of FIG. 8.

The roaming number (mentioned above with respect to action 8-13, for example) can include a Network Routing Prefix (NRP) suitable for locating to which HLR the subscriber currently belongs. The allocation of MSISDN numbers within GSM has been done in similar way as in a fixed network, e.g., allocation number series per providers. However, when mobile subscribers desire to change network provider and port (e.g., relocate) their number, the MSISDN can no longer be used to locate the correct HLR. Instead, the NAPS must be consulted to get the NRP for the correct HLR. The HLR then communicates with the Visiting Location Register (VLR) which generates a roaming number consisting of a NRP and a temporary VLR number related to the subscriber in question. When the Mobile Switching Center with Visiting Location Register (MSC/VLR) is reached, the NRP is recognized as its own and the rest of the number is analyzed to obtain information from the VLR in which Base Station Controller (BSC) the subscriber currently resides.

It should be understood that the NRP/NRN used for locating the GMSC (as CdPN) may or may not be the same as used for locating the HLR (as Global Title). In the case the NRN is the IMSI number for the called MSISDN number, routing to the GMSC is enhanced and the GMSC can use this same IMSI number to locate the HLR and finally the HLR can use the IMSI number to recreate the MSISDN number. This requires ISUP based routing to understand the numbering plan of IMSI (not E.164 which is relevant for the MISIDN). Inclusion of IMSI means that the MSISDN need not be transported in the network once the IMSI has been determined, i.e., no extra data is transported.

Figure 8A:
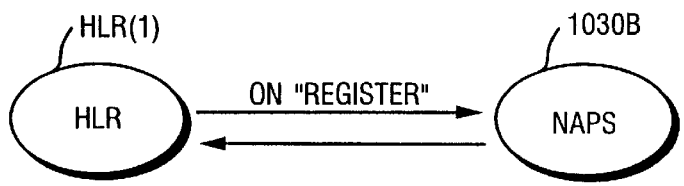
FIG. 8A and FIG. 8B are schematic drawings illustrating communication between NAPS of the invention and a Home Location Register (HLR) for permitting a subscriber to use a same directory number for both fixed and mobile telephones.
Figure 8B:
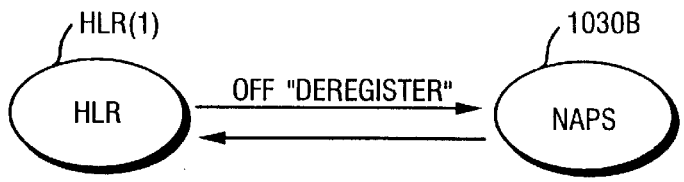

FIG. 8A and FIG. 8B show that subscriber sub-B's home location register HLR(1) can be connected to NAPS 1030B in a manner so that subscriber sub-B can use the same directory number for both mobile and fixed locations. Given such connection, as a result of commands initiated from subscriber sub-B's mobile telephone, HLR(1) sends a "Register" message for subscriber sub-B to server (NAPS) 1030B. Upon receipt of such a "Register" message, server 1030B changes in its database the NRP associated with subscriber sub-B's directory number from the local exchange serving subscriber sub-B's fixed telephone to GMSC. Conversely, as illustrated by FIG. 8B, a "Deregister" message from HLR(1) to server 1030B prompts server 1030B to change its database so that the NRP associated with subscriber sub-B's directory number returns to the exchange identifier for subscriber sub-B's fixed telephone. The HLR is addressed using TCAP; HLR will likely have a different destination than GMSC since they do not normally reside in the same entity.

Figure 9:
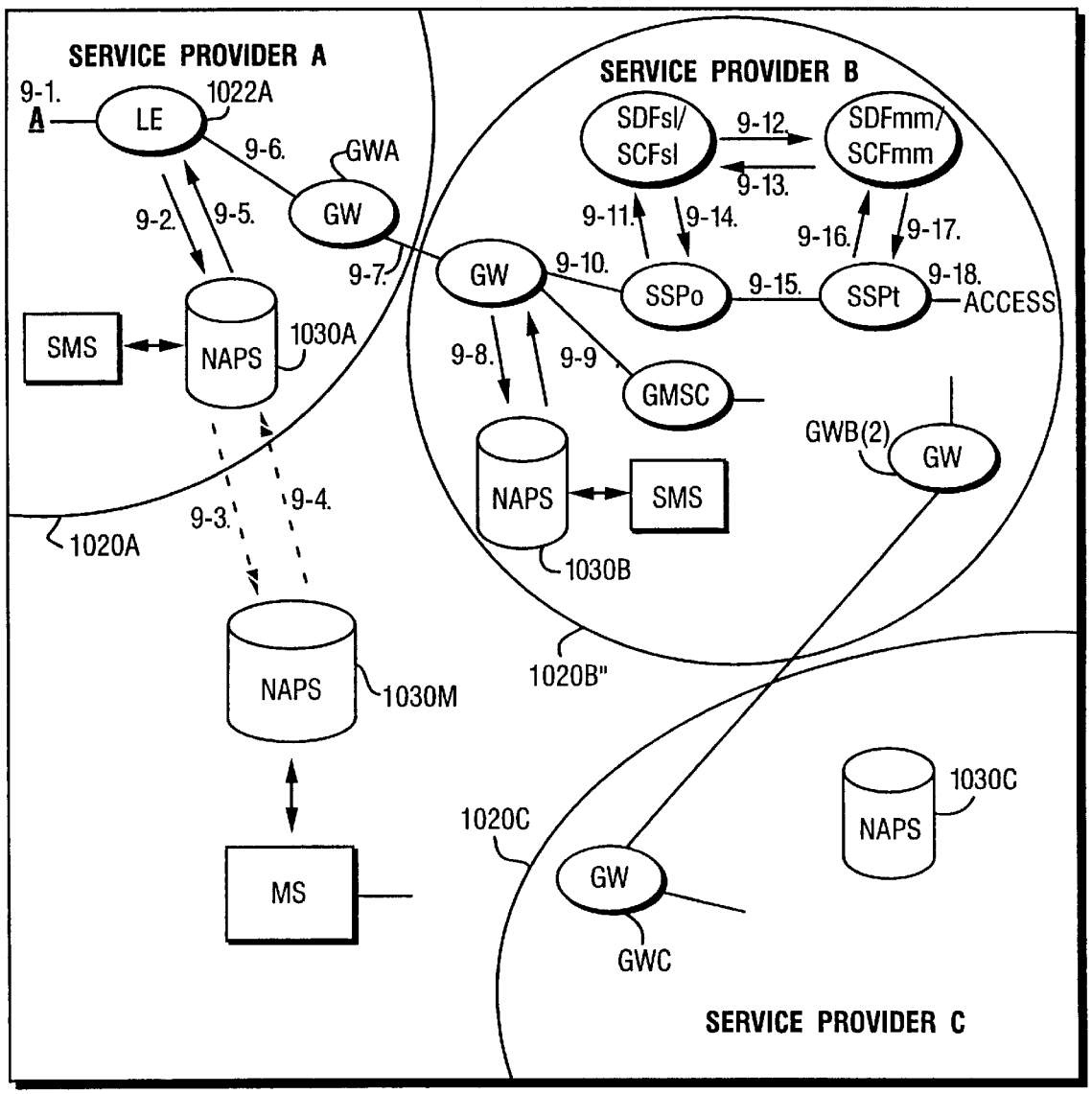
FIG. 9 is a schematic view of a plurality of domains maintained by different service providers and illustrating applicability of number relocateability to Cordless Terminal Mobility (CTM) calls.

FIG. 9 illustrates applicability of number portability for cordless terminal mobility (CTM) subscribers using a roaming number approach for handling incoming (terminating) CTM calls. In FIG. 9, domain 1020B' provides CTM service and is illustrated as having an originating Service Switching Point (SSPo), Service Data Functions service logic (SDFsl) or Service Control Functions service logic (SCFsl), Service Data Functions mobility management (SDFmm) or Service Control Functions mobility management (SCFmm), and a terminating Service Switching Point SSPt.

When a CTM subscriber changes service provider a new international portable user identifier (IPUI) should be received (i.e., an new IPUI which is not portable), but the CTM-number will be kept by the subscriber when porting. When porting a CTM subscriber between service providers, it must be possible for a service provider's network, in a relocateability domain, to route a call to the ported subscriber based on the CTM number.

For reaching the terminating network, the same procedures apply as above discussed for FIG. 8. That is, FIG. 9 has actions 9-1 through 9-9 which are analogous to actions 8-1 through 8-9 of FIG. 8, except that action 9-9 involves returning a NRN with a Network Routing Prefix (NRP) to subscriber sub-B's SSPo. Action 9-10 shows the routing message with the NRP being forwarded to the SSPo and implicitly also addressing the SCPsl.

The SSPo translates the CTM number included in the routing message to a Global Title (GT) used for addressing the SCFsl. Normally the CTM number is inserted as the Global Title, but now a translation is needed for avoiding any updates in intermediate STPs. This translation can be done internally in the SSPo or a query can be made to a database for obtaining a translation from the CTM number to a number used for GT addressing towards the SCPsl. Alternatively, the NRP delivered by server 1030B could be used for addressing the correct SCPmm (which means that the NRP should not only point out the SSPo but also the SCPmm).

At action 9-11 the home SCPsl for subscriber sub-B is called. The CTM number is included in the InitialDP sent from SSPo to SCPsl. The InitialDP is the query on ITU-T & ETSI standardized INAP protocol versions 1 & 2, and is the first operation sent from a service switching point to a service control point when an intelligence ("IN") trigger is detected in the service switching point. The SDFsl maintains an association between the CTM number and the international portable user identifier (IPUI). Action 9-2 shows subscriber sub-B's SCPsl calling (including IPUI) the SCPmm. At action 9-13 the SCPmm selects and returns a roaming number to subscriber sub-B's SCPsl. Action 9-14 involves the SCPsl passing the roaming number to the SSPo. At action 9-15 the SSPo uses the roaming number in the routing message (CdPN) to address the SSPt where subscriber sub-B resides. At action 9-16 subscriber sub-B's terminal is paged using the international portable user identifier (IPUI). Action 9-17 shows a connect operation from SCFmm to the terminating service switching point SSPt; action 9-18 shows a setup message to the called party's (subscriber sub-B) CTM terminal.

It should be noted that if there is a fixed relationship with SSFo and SCFsl (which means that the addressing of SCFsl by SSFo is not based on CTM number) then SCFsl in the visiting network needs to translate the CTM number received in the query from SSFo for being able to retrieve an address which can be used as Global Title for reaching the home SCFsl of the called CTM subscriber. Alternatively the visiting SCFsl can query the NAPS for the translation of the CTM number to the address of the home SCFsl for the called CTM subscriber.

Figure 9A:
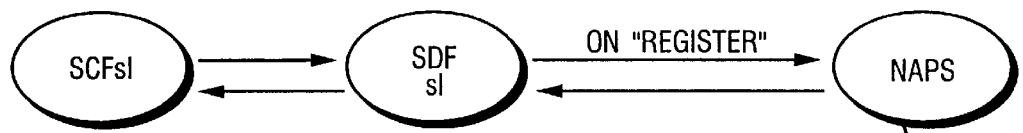
FIG. 9A and FIG. 9B are schematic drawings illustrating communication between NAPS of the invention and functions involved with CTM for permitting a subscriber to use a same directory number for both fixed and CTM equipment.

As a modification of the operation shown in FIG. 9A, NAPS 1030A or NAPS 1030M can advise local exchange 1022A of the node address of SSPo of domain 1020B", so that the call can be routed as shown by actions 9-6, 9-7 and 9-10. Then, the SSPo could query NAPS 1030B to find out which SCFsl to invoke. After the query and discovery of the appropriate SCFsl, actions 9-11 through 9-18 are performed as shown in FIG. 9. This modification can occur when the operator of domain 1020A and the operator of domain 1020B have an agreement that a CTM subscriber can roam into an area which is not served by the CTM subscriber's "own" operator, and yet the CTM subscriber still be able to receive and originate calls, i.e., by using the visiting SSPo and the home SCFsl.

Figure 9B:
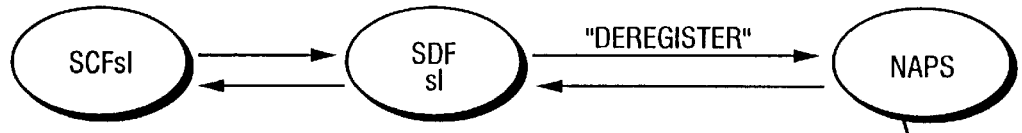

FIG. 9A and FIG. 9B show that subscriber sub-B's SDFsl can be connected to NAPS 1030B in a manner so that subscriber sub-B can use the same directory number for both CTM and fixed locations, in similar manner with FIG. 8A and FIG. 8B described above. In this regard, as illustrated in FIG. 9A, when a "Register" message is received by server (NAPS) 1030B from SDFsl, server 1030B associates in its database the NRP for subscriber sub-B's SDFsl with subscriber sub-B's directory number, rather than the local exchange which services subscriber sub-B's fixed telephone. The converse action of "deregistering" is shown in FIG. 9B. As an alternative to the foregoing, it should also be understood that in similar manner the SCFsl can perform the "register" and "deregister" actions.

Concerning the portability of a subscriber's number from a fixed location to a mobile location (e.g., GSM or CTM), the originating local exchange should preferably always query the NAPS since it is the NAPS that knows the current type of access used by the called party. In a situation in which all calls do not automatically invoke a query of the NAPS, the query procedure can be initiated by setting a special category on the called line. This is to trap local calls to this subscriber also in the home local exchange (since local calls might be placed without a query of the NAPS as explained previously).

In both GSM and CTM applications, two addresses are generally required by subscriber number. In GSM, the GMSC and the HLR address (NRP) are required. In CTM the SSPo and the SCFsl or SDFsl (home register in CTM) are required.

The fact that a subscriber number will be "local" in an exchange also means that the subscriber number can be defined in several exchanges at the same time. The NAPS can then be used to select which exchange to route the calls through, either randomly or by other criteria, such as time of day called party, time of day calling party, calling party number, called party number, black list of called party, white list of called party, teleservice type (e.g., FAX, speech), Transmission Medium Requirement (TMR), type of station currently in use (GSM, CTM, ordinary), considerations involving the NAPS being in a different time zone than the called party, etc.

As mentioned above, FIG. 12 shows the format of a called party parameter (CdPN) of the ITU-T Rec. Q.763 standard, an industry standard. The called party parameter (CdPN) is a routing message utilized to route calls between exchanges of a telecommunications system. The present invention utilizes a number relocateability flag NRF which is used to indicate whether the called number associated with a CdPN parameter has the number relocateability capabilities of the present invention. In one embodiment, the NRF is chosen as one of the spare values of the NAI. Hereinafter a setting of the relocateability flag NRF is understood for such embodiment to be a setting of an appropriate value in the NAI field as illustrated in FIG. 12.

It should be understood that the present invention is not limited to use of the industry standard called party parameter CdPN, but instead that other types of routing messages can be utilized. It so happens that FIG. 8 and other figures referenced herein employ Network Routing Prefix (NRPS) that illustratively have three digits. The use of three digits in the figures is merely for convenience and by way of example, it being understood that the invention is not restricted to three digits and that a lesser or (more likely) greater number of digits can be employed as allowed by the protocols implemented in each case. Nor is the invention specific to lengths or ordering of the other fields shown in FIG. 12.

The Network Routing Prefix (NRP) of the present invention is an example of an exchange or node identifier which is included in the address signal field (ASF) of the routing message in such a manner as to precede the directory number of the called party. It should be understood that the node identifier (NI) can be included in positions other than leading bit positions of the ASF of the routing message.

The present invention thus solves problems previously anticipated by affording MSISDN portability to mobile susbcribers. The invention addresses the problem of the mobile subscriber visiting foreign countries, since the foreign network being visited by the mobile subscriber can query the home country of the mobile station with the first STP encountered in the home country sending a request to a database or NAPS serving the STP, and thereby have the call redirected to the current service provider for the visiting mobile subscriber. Moreover, when a service provider reorganizes or redistributes subscribers with respect to its HLRs, only the databases or NAPs of the network need be updated, thereby obviating any modification of global title analysis in the reorganizing service provider's network and other networks.

While the invention has been particularly shown and described with reference to the preferred embodiments thereof, it will be understood by those skilled in the art that various alterations in form and detail may be made therein without departing from the spirit and scope of the invention. For example, it should be understood that the number (four) of domains shown in FIG. 1A is for illustrative purposes only, and that a greater or lesser number of domains may be employed.

The embodiments of the invention in which an exclusive property or privilege is claimed are defined as follows:

1. A telecommunications network comprising a set of service provider domains, at least one of tbe domains in the set of domains being a mobile telecommunications domain serving mobile telecommunications stations, wherein a call-originating domain included in the set of domains accesses a mobile subscriber number portability database to obtain information to be included as a parameter in a routing message for routing a call made from the call-originating domain to a called mobile station, and wherein the information includes (1) an address of a node in the telecommunications domain which currently serves the called mobile subscriber and (2) an identification of the called mobile station sufficient to allow the telecommunications domain in which the currently serves the called mobile station to access a home location register (HLR) of the called mobile station, and wherein a plurality of the mobile telecommunications domains comprise mobile subscriber number portability databases, and wherein gateway nodes of the plurality of the mobile telecommunications domains comprising mobile subscriber number portability databases access the corresponding mobile subscriber number portability databases.

2. The network of claim 1, wherein the network further includes a central management system which updates the mobile subscriber number portability databases when a mobile subscriber changes membership from a first of the mobile telecommunications domains to a second of the mobile telecommunications domains.

3. A method of routing calls through a telecommunications network, the telecommunications network having a set of service provider domains, at least one of the domains in the set of domains being a mobile telecommunications domain serving mobile telecommunications stations, the method comprising:

accessing, in a call-originating domain included in the set of domains, a mobile subscriber number portability database to obtain an address of a gateway node of the mobile telecommunications domain which currently serve a called mobile subscriber;

including the address of the gateway node of the mobile telecommunications domain which currently serves a called mobile subscriber as a parameter in a routing message for routing a call made from the call-originating domain to a called mobile subscriber;

sending the routing message via the gateway node to the mobile telecommunications domain which currently serves the called mobile subscriber; and then in the mobile telecommunications domain which currently serves a called mobile subscriber, accessing a home location register (HLR) of the called mobile subscriber;

wherein a plurality of the mobile telecommunications domains comprise mobile subscriber number portability databases, wherein the gateway nodes of the plurality of the mobile telecommunications domains comprising mobile subscriber number portability databases access the corresponding mobile subscriber number portability databases, and wherein the method further comprises using a central management system to update the mobile subscriber number portability databases when a mobile subscriber changes membership from a first of the mobile telecommunications domains to a second of the mobile telecommunications domains.

* * * * *